INVENTORS
Irving W. Doyle
H. Erwin Hale
BY Blair, Curtis + Hayward
ATTORNEYS

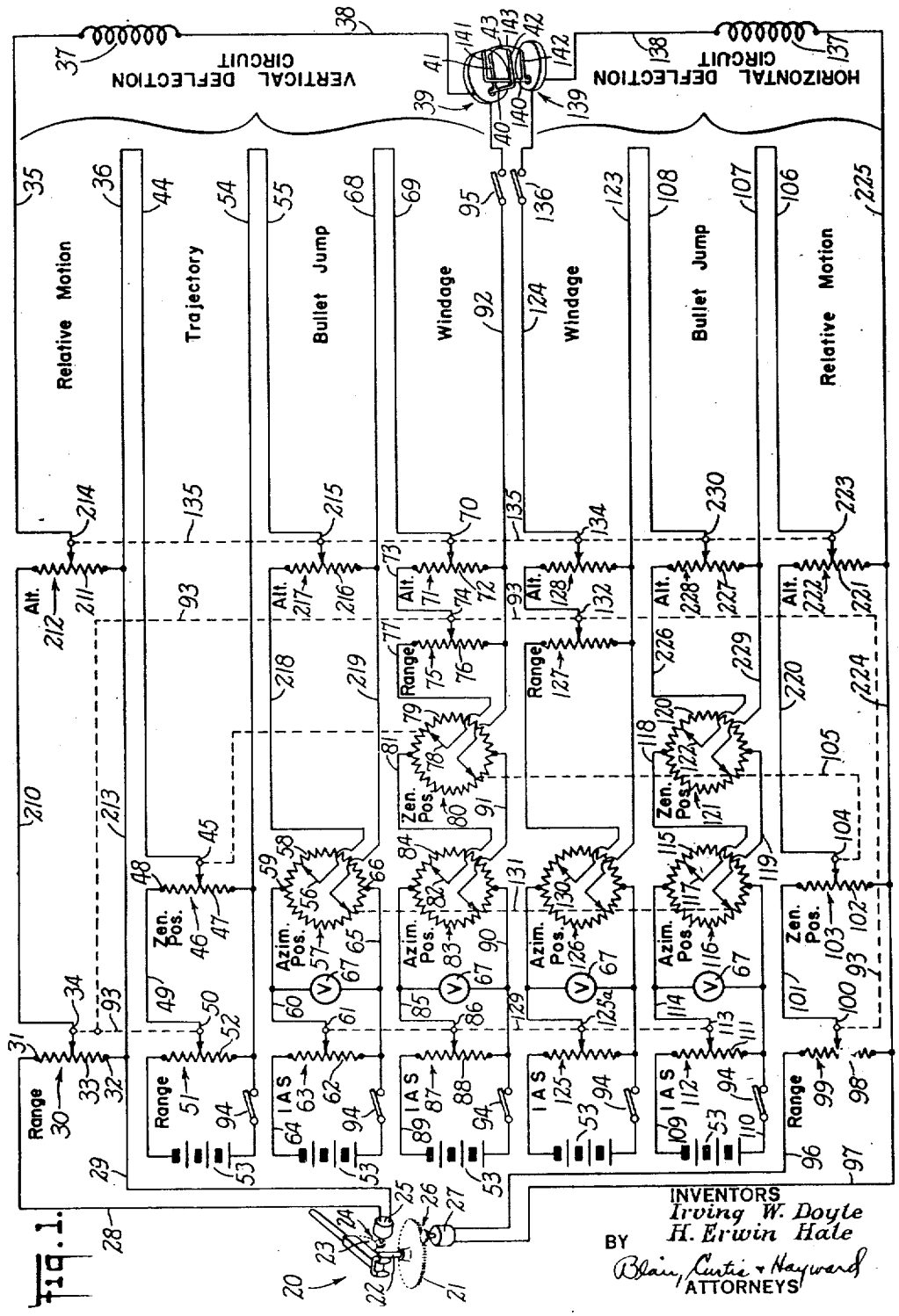

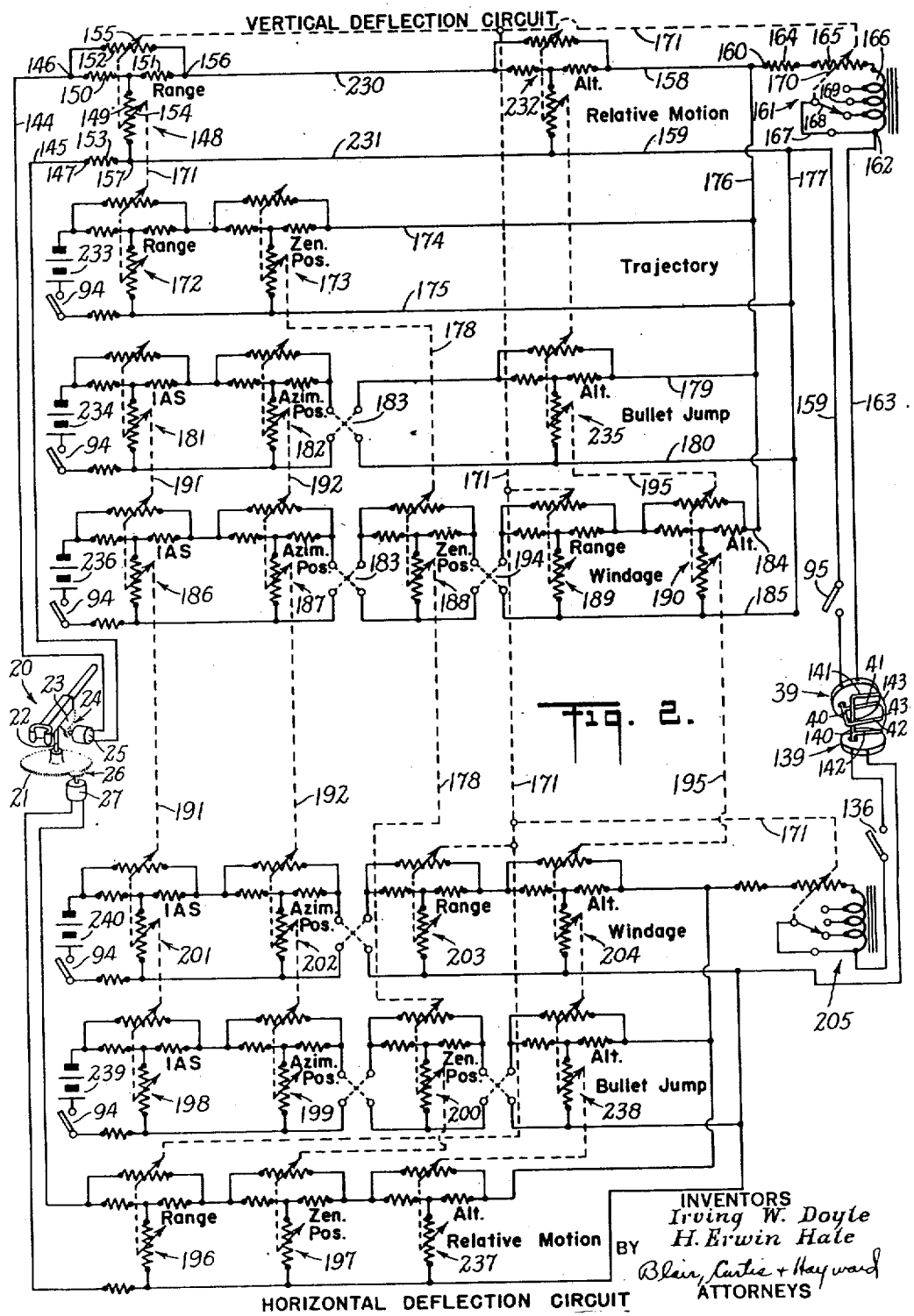

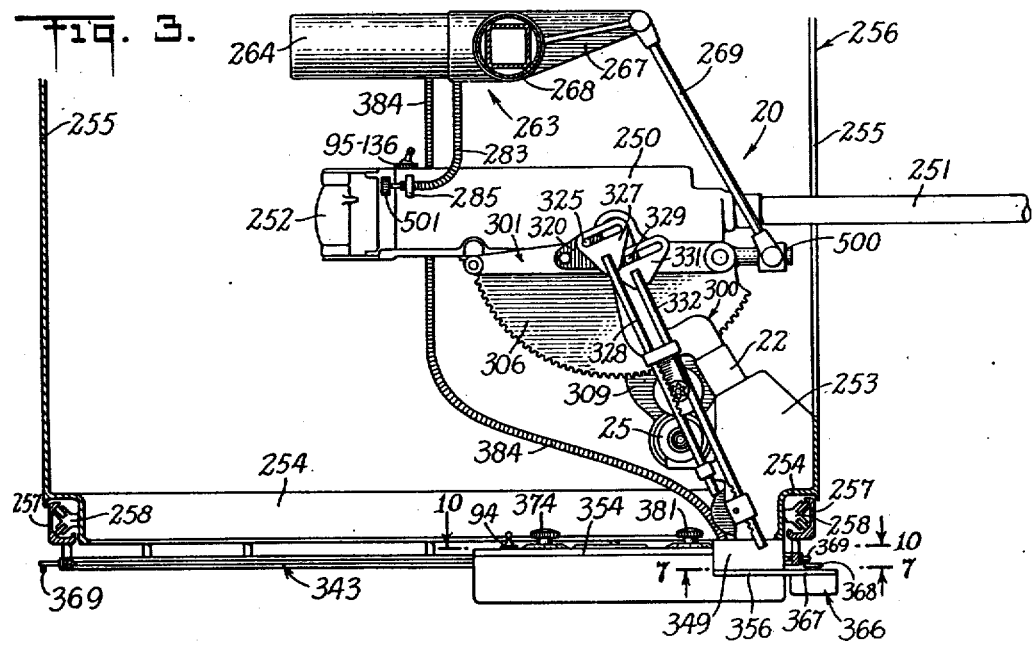
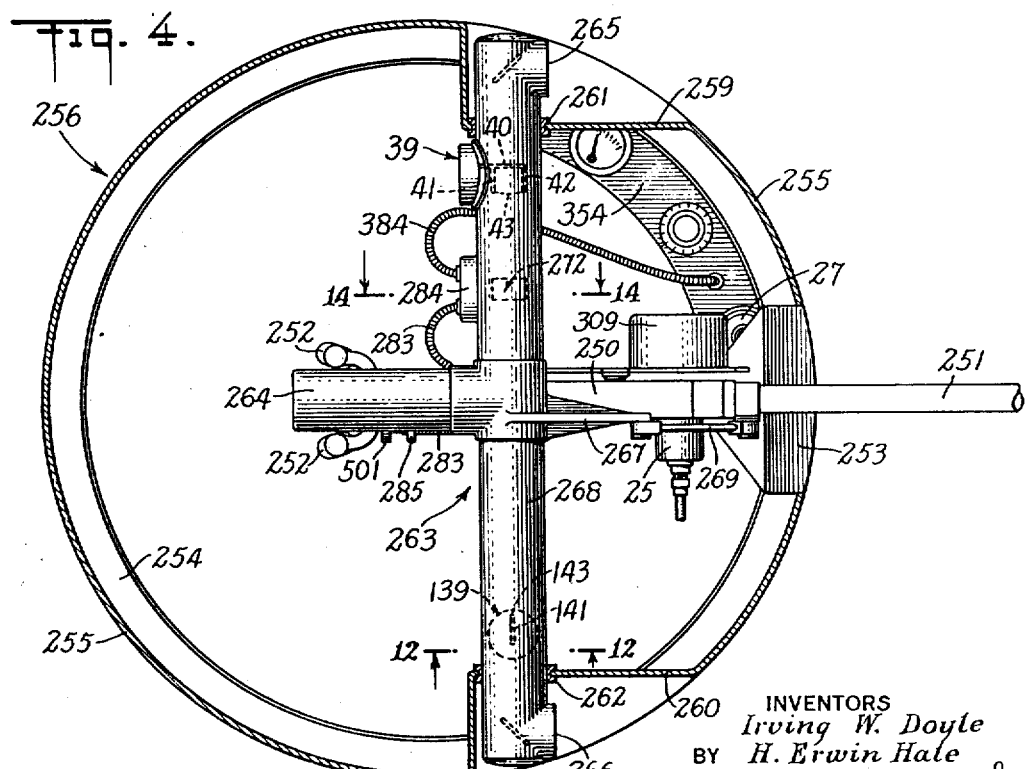

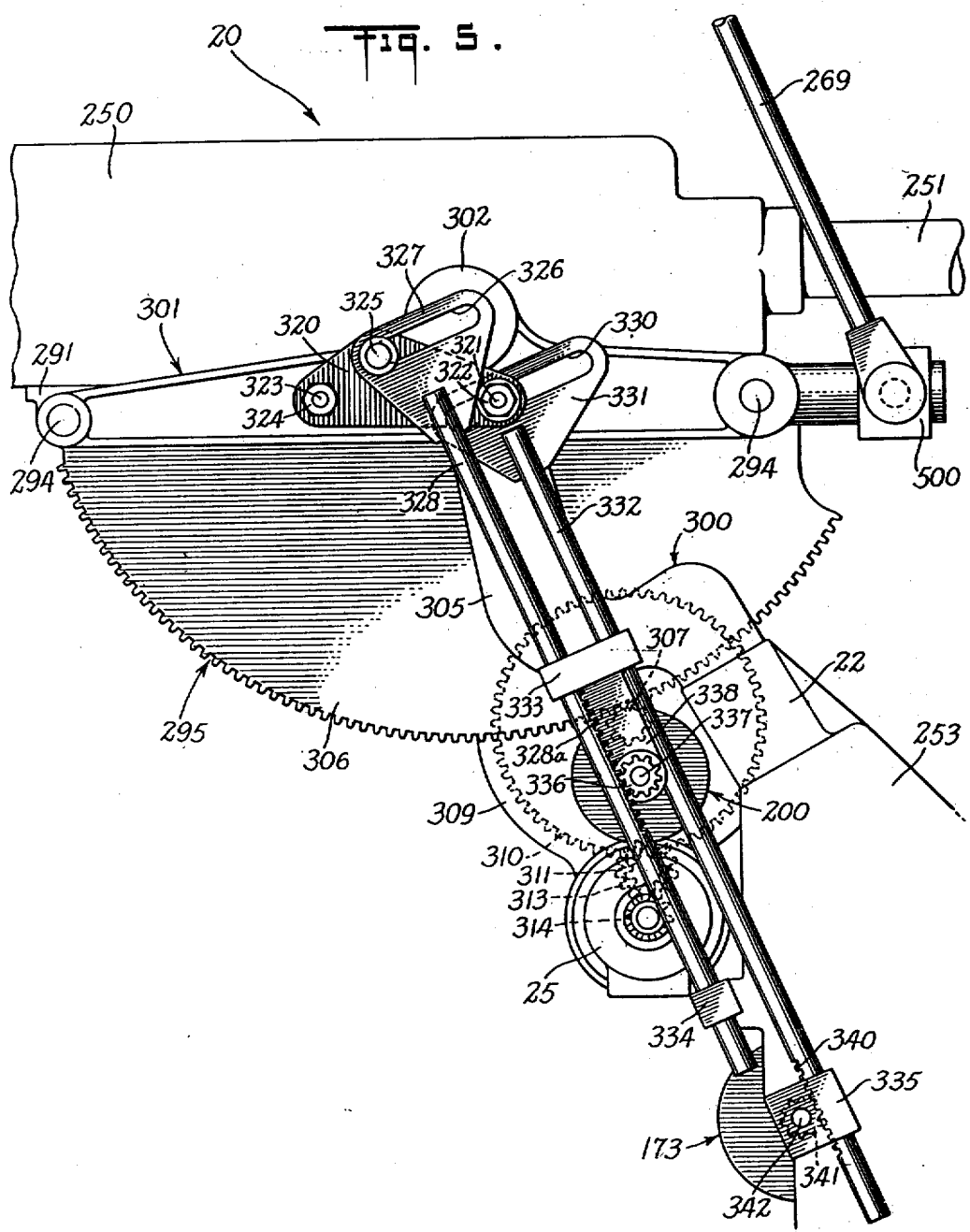

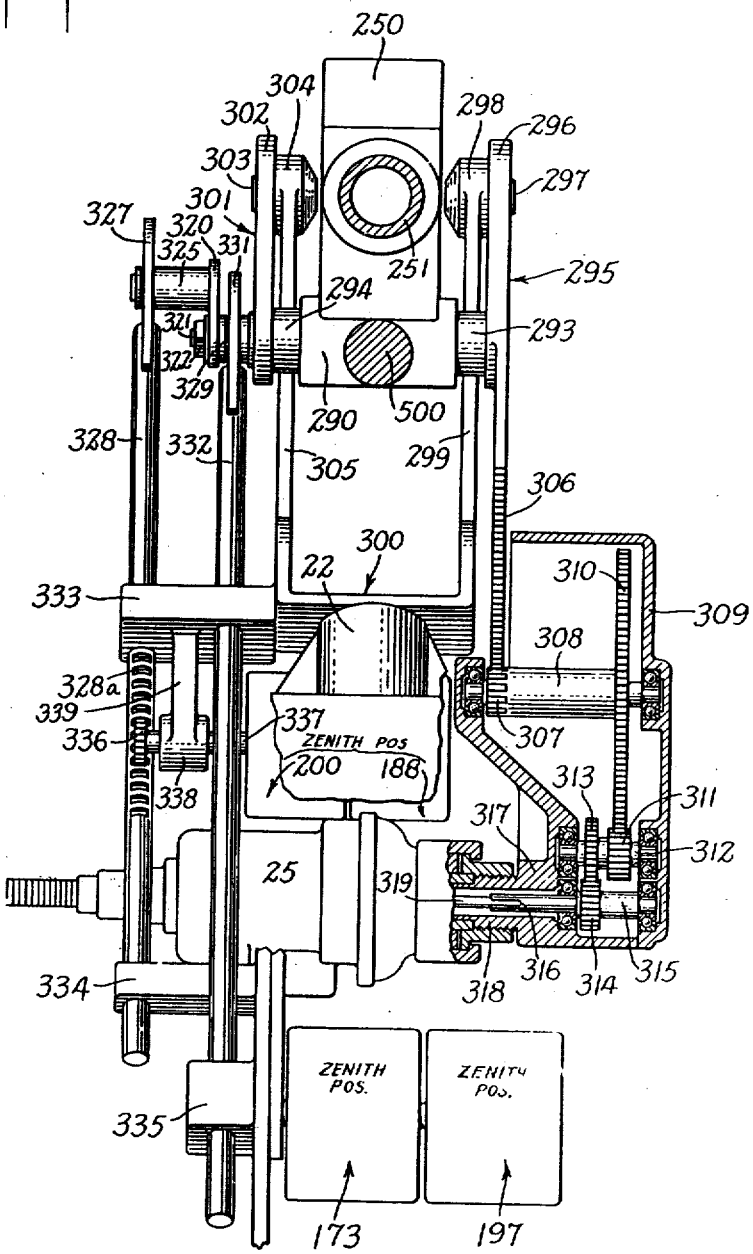

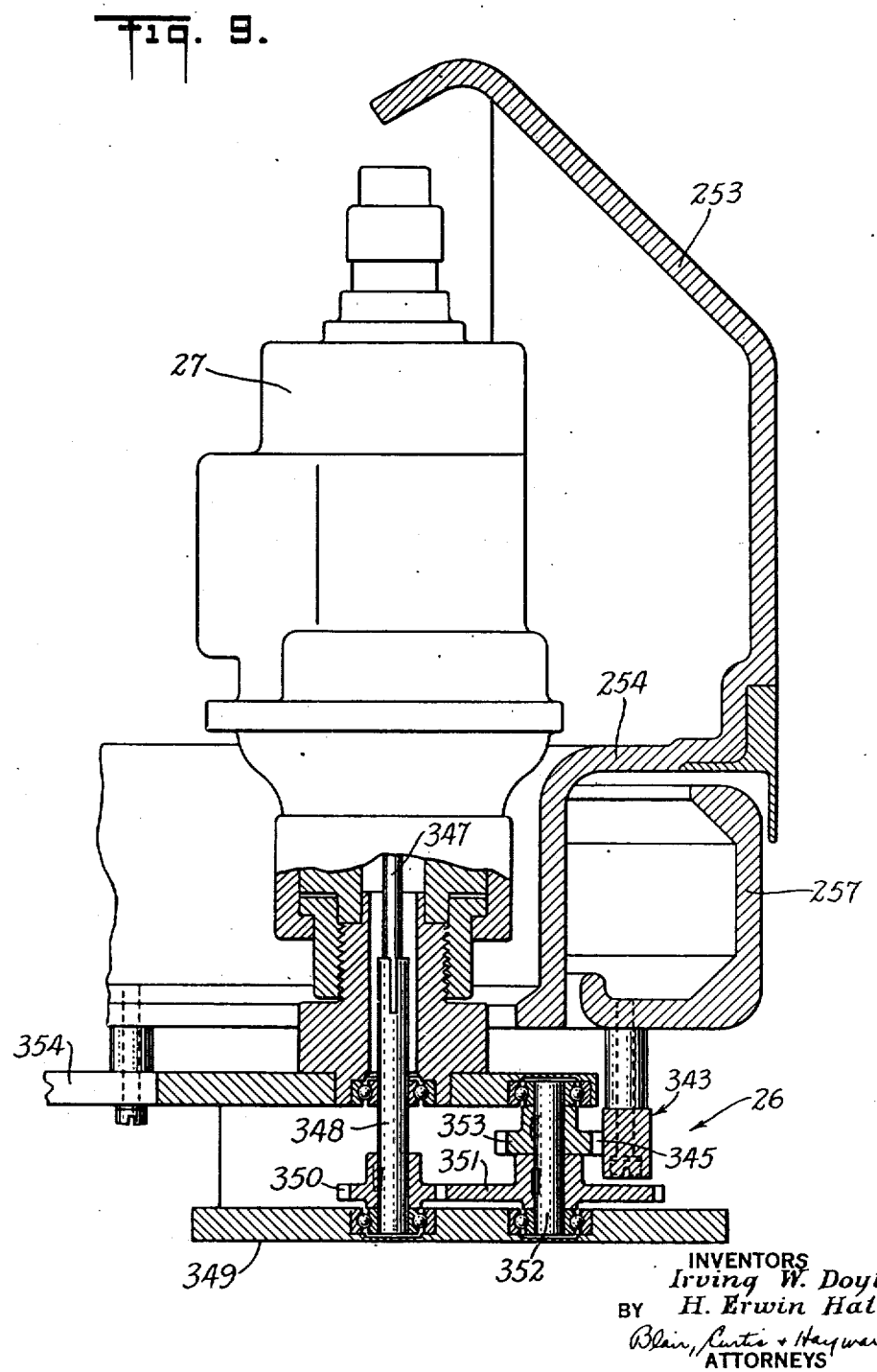

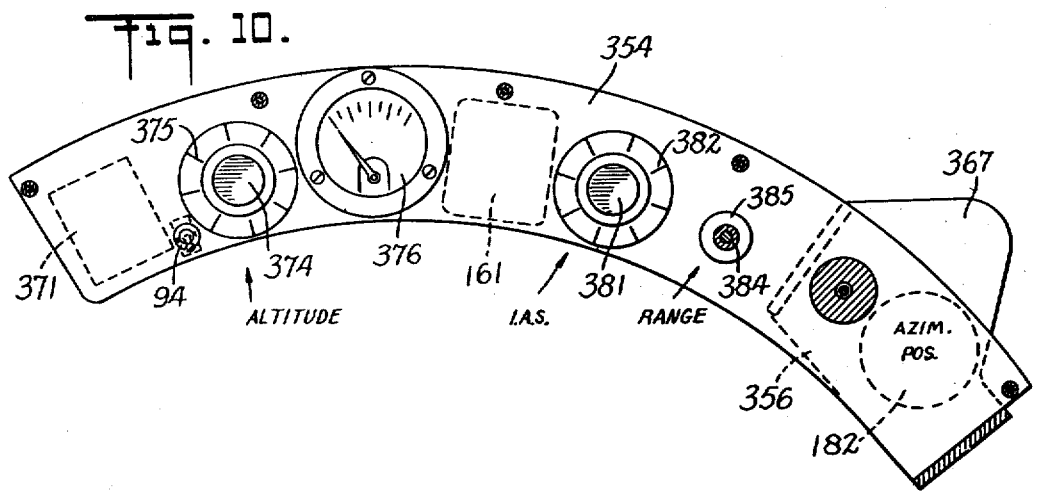
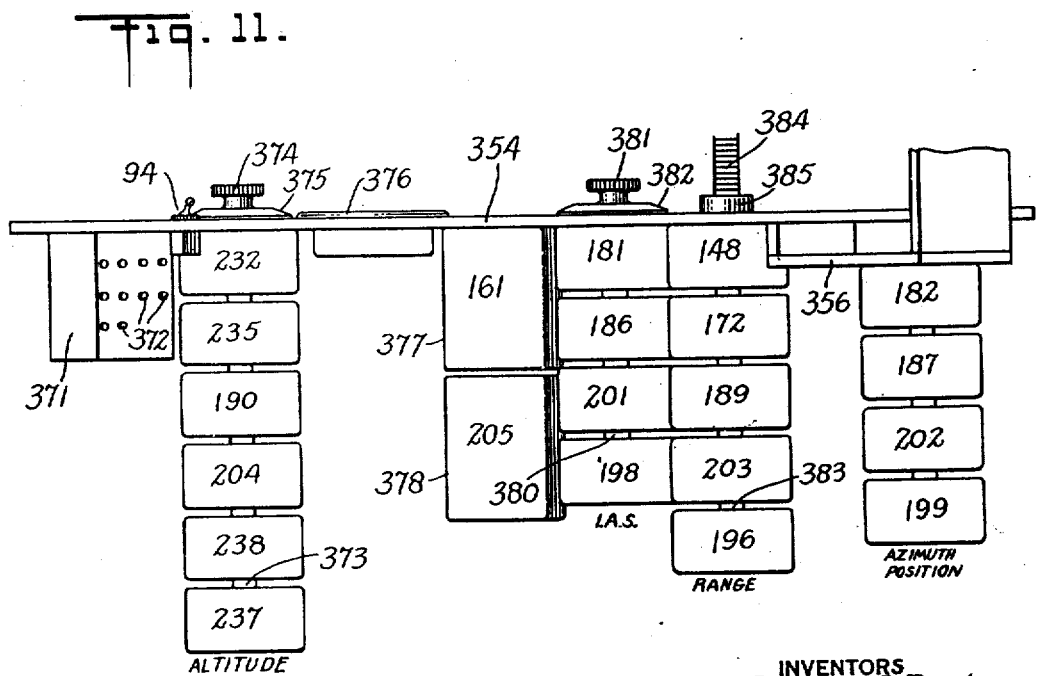

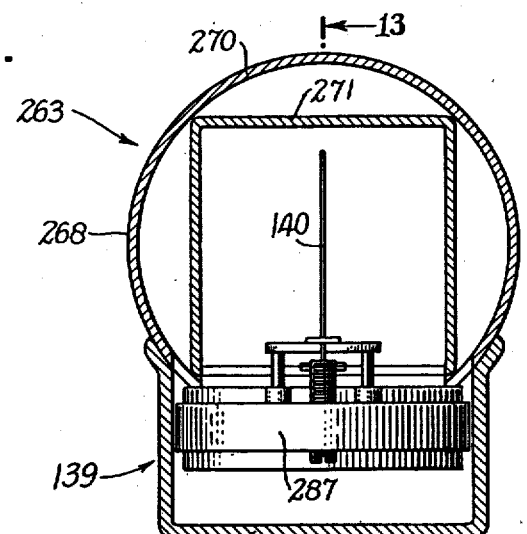
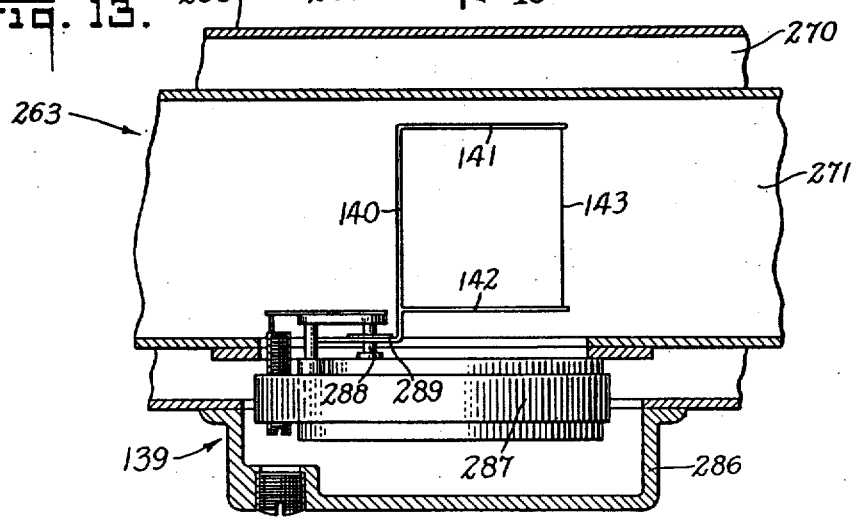
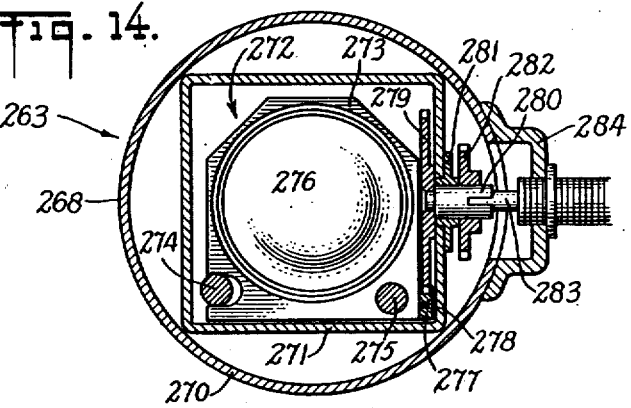

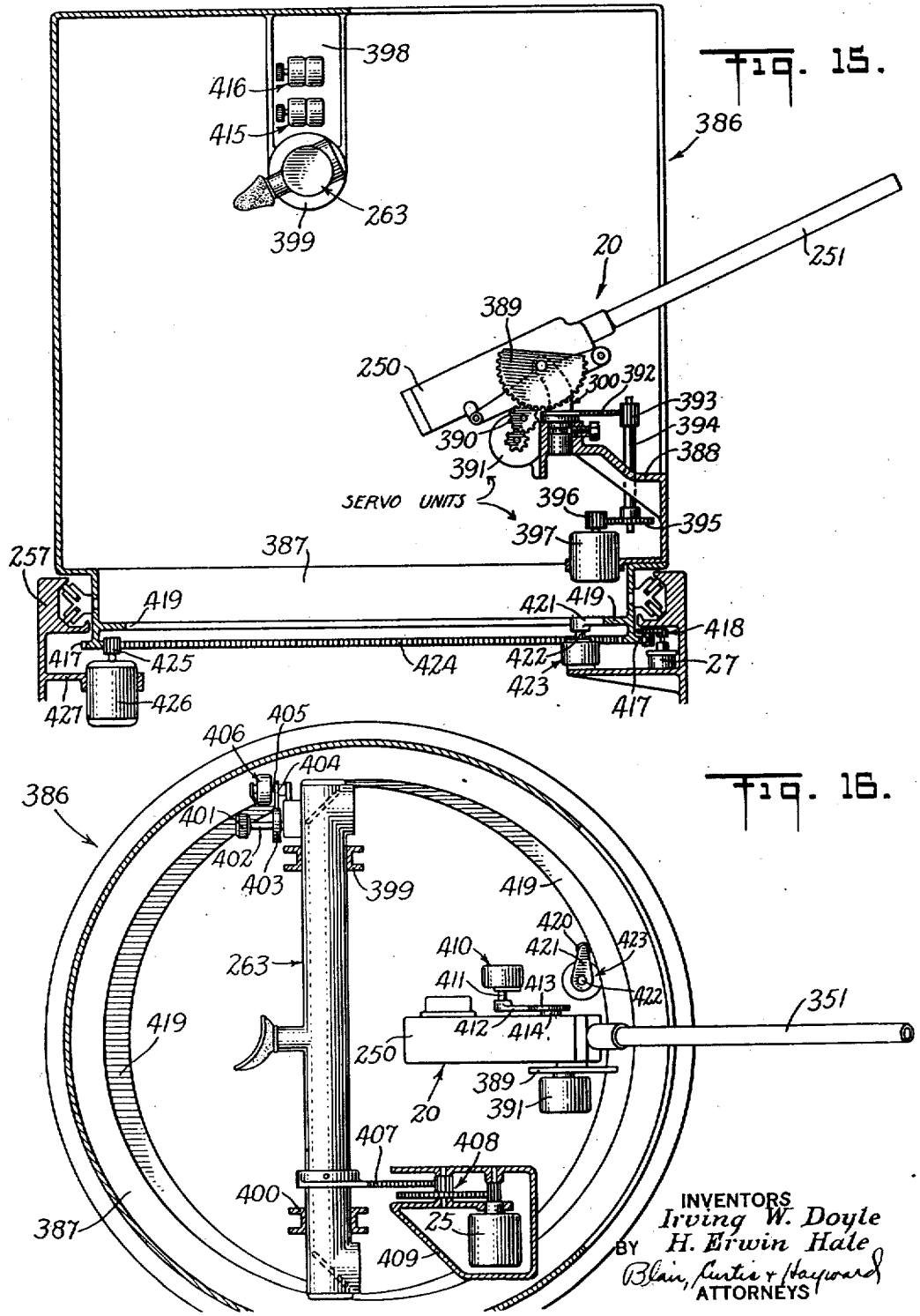

Patented May 7, 1946

2,399,726

UNITED STATES PATENT OFFICE 2,399,726

APPARATUS FOR AIMING GUNS

Irving W. Doyle, Amityville, and Henry Erwin Hale, Freeport, N. Y., assignors to Fairchild Camera and Instrument Corporation, a corporation of Delaware Application March 11, 1940, Serial No. 323,474

16 Claims. (Cl. 33—49)

This invention relates to a method of and apparatus for aiming a gun, and more particularly for aiming a machine gun or cannon at a target as the gun and target move relatively.

It is among the objects of this invention to provide a method of and apparatus for sighting a gun, by which the aim of the gun is automatically corrected to compensate for various factors which affect the course of a projectile. Other objects will be in part apparent, and in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the drawings, wherein there are shown several embodiments of our invention,

Figure 1 is a schematic view of a portion of our apparatus, together with a control circuit therefor;

Figure 2 is a view similar to Figure 1, but showing a modified control circuit;

Figure 3 is a sectional elevation of a bomber turret wherein our apparatus is mounted;

Figure 4 is a plan view of the bomber turret and gun aiming apparatus;

Figure 5 is an enlarged elevation of a portion of a machine gun mount incorporating certain structural features of our apparatus;

Figure 6 is a fragmentary rear elevation, partly in section, of the apparatus of Figure 5;

Figure 9 is an elevation, partly in section, taken along the line 9—9 of Figure 7;

Figure 10 is an enlarged plan view indicated by the line 10—10 of Figure 3;

Figure 11 is an elevation of Figure 10;

Figure 12 is an enlarged sectional elevation taken along the line 12—12 of Figure 4;

Figure 13 is a sectional view taken along the line 13—13 of Figure 12;

Figure 14 is an enlarged sectional elevation taken along the line 14—14 of Figure 4;

Figure 15 is a sectional elevation of a turret having mounted therein a modified form of our apparatus; and, Figure 16 is a top plan view of the apparatus shown in Figure 15.

Similar reference characters refer to similar parts throughout the various views of the drawings.

Figure 7:
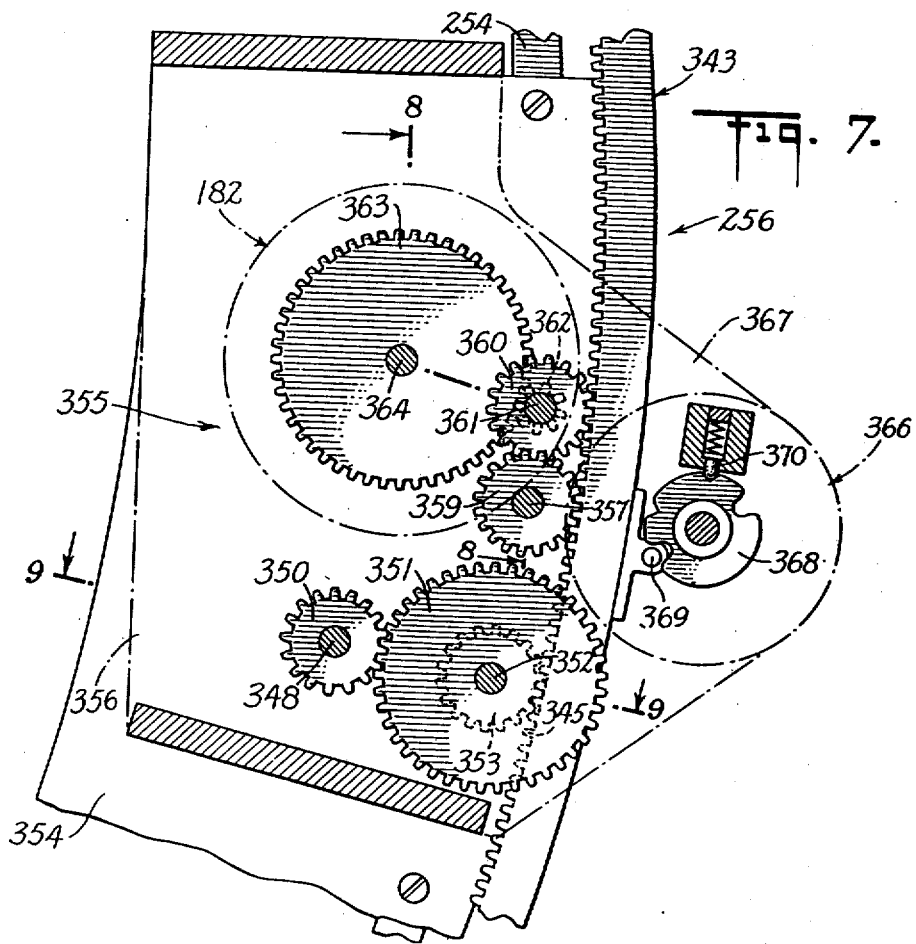
Figure 7 is a bottom plan view taken along the line 7—7 of Figure 3.

To facilitate an understanding hereof, and to expedite the description, the invention will be considered hereafter as applied only to machine guns adapted to be movably mounted on aircraft such as bombers or dirigibles, it being understood, however, that the invention is applicable to field guns of a caliber larger than that of machine guns, and to various other types of guns such as naval cannon and anti-aircraft guns adapted to shell moving targets.

Conventional aerial machine gun sights have undergone little change or improvement for a number of years, and are principally characterized by a number of concentric rings mounted on the gun barrel at a distance from its muzzle, the muzzle end of the barrel having a bead, or sometimes a pantagraphic device. In aiming the gun by a sight of this character, the gunner, in establishing his line of sight, estimates the range of his target, the elevation to attain correct projectile trajectory, and such other factors as enter into the aiming of the gun, and approximates a position within the concentric rings with which he aligns the bead and target. Obviously there is more guesswork and human skill involved in accurately aiming the gun with a sight of this character than there is mathematical certainty that the target will be hit. It is for this reason that the proportion of hits in target practice or in actual combat is small.

There are a number of factors in aerial gunnery which cause horizontal and vertical components of deviation between the line of fire and the line of sight of the gun, and which must be compensated for in aiming the gun to effect coincidence of bullet and target. These factors will hereinafter be referred to as:

1. Lead, or relative motion, i. e. the line of fire must be at an angle to the line of sight when there is relative motion between the gun and target so that the gun leads its target.

2. Trajectory, or superelevation, i. e. the superelevation, excluding air stream effects, of the gun necessary at the instant of fire to effect coincidence of bullet and target.

3. Bullet jump, i. e. as a bullet emerges from the gun barrel, the rifling therein imparts spin to the bullet, the bullet thus having a gyroscopic action which, when the air stream hits the bullet, causes it to precess in a direction normal to the air stream or direction of force applied, except when the gun is firing straight into or with the air stream.

4. Windage, i. e. the horizontal deflection of the bullet from its true line of flight when the gun is moving at a substantial velocity due to the air stream rushing past the gun muzzle when the gun is firing in any direction except one coaxial with its path of movement.

The values of these factors of relative motion, trajectory, bullet jump and windage are determined by the factors of:

1. Range (instantaneous distance between gun and target)
2. Zenith position (angle between zenith and gun)
3. Azimuth position (clockwise angle between line of flight and line of fire)
4. Indicated air speed (hereafter referred to as IAS)
5. Altitude (air density)

These latter five factors are effective singly or in combination in determining the values of horizontal and vertical components of relative motion, trajectory, bullet jump and windage, as follows:

A. Vertical component
  1. Lead (relative motion)
    a. Range
    b. Altitude
  2. Trajectory
    a. Range
    b. Zenith position
  3. Bullet jump
    a. IAS
    b. Azimuth position (zero effect when firing fore and aft)
    c. Altitude
  4. Windage
    a. IAS
    b. Azimuth position (zero vertical component effect when firing dead abeam)
    c. Zenith position (zero vertical component effect when firing in horizontal plane)
    d. Range
    e. Altitude
B. Horizontal component
  1. Lead (relative motion)
    a. Range
    b. Zenith position
    c. Altitude
  2. Bullet jump
    a. IAS
    b. Azimuth position (zero effect when firing dead abeam)
    c. Zenith position (zero effect when firing in horizontal plane)
    d. Altitude
  3. Windage
    a. IAS
    b. Azimuth position (zero effect when firing fore and aft)
    c. Range
    d. Altitude By way of illustration, let us assume that the gun plane is flying due south at an altitude of 2,000 feet and the target plane is also flying due south on a parallel course at an altitude of 2,500 feet, that the two courses of the planes are displaced laterally 1,500 feet, and that firing commences when the planes are 1,000 feet apart horizontally. This set of conditions brings into effect both the vertical and horizontal components of relative motion, trajectory (there is no horizontal component of deviation in compensating the line of fire for trajectory), bullet jump and windage. Under these conditions, at the instant of fire, when properly aimed, the gun points upwardly, forwardly and abeam of the gun plane. Hence the line of fire must be corrected with respect to the line of sight of the gun 1. To lead the target (allow for the relative motion of the two planes,
2. To compensate for the vertical component of trajectory occasioned by the superelevation of the gun and range of the target,
3. To compensate for the vertical and horizontal components of bullet jump occasioned by IAS, the deviation of the line of fire from both the vertical and horizontal, and
4. To compensate for the vertical and horizontal components of windage occasioned by IAS, the deviation of the line of fire from both the vertical and horizontal, range and altitude.

The corrected line of fire is accordingly the resultant of the several vertical and horizontal components modified by the range of the target and the altitude of combat. It is this complex resultant which is beyond human ability to attain with such a degree of accuracy as to effect efficient gunnery, particularly under stress of combat firing.

Many modern bombers which can readily attain speeds well in excess of 200 miles per hour, are equipped with various types of turrets in which machine guns are mounted. Some of these turrets are of the retractable type, extendible from the plane's fuselage. Others take the form of blister-like protrusions pivoted from the fuselage, so that the turret gun is capable of a certain amount of universal motion relative to the fuselage. Further to facilitate the purposes and understanding hereof, the description will be confined to that type of turret which is extendible from the plane fuselage, rotatable relative thereto, and in which a gun is mounted for pivotal movement in vertical planes so that the gun muzzle is movable substantially universally within limits defined by such portions of the airplane structure as lie within the line of fire of the gun. The structural features of such a gun mount will be described in detail hereinbelow.

By way of generally describing the structure which embodies our invention, it is first to be noted that in one form of our apparatus a telescopic sight, preferably of the range finder type, is secured to the gun and related to the gun turret in such a manner that its horizontal and vertical components of movement are identical to those of the gun, i. e. the gun and sight move as a unit. At a focal plane within the range finder is a reticle composed of vertical and horizontal cross hairs, respectively attached to galvanometer needles so as to move therewith. Accordingly at the point where the hairs cross, a reference mark capable of universal planar movement is established which with the target comprises the line of sight of the gun which can deviate relative to the line of fire thereof, as will be described. As the lines of sight and fire do deviate, and as their deviation varies under certain circumstances, it will appear from the above that the deviation is proportional to the factors of lead, trajectory, bullet jump and windage. The field of view of the range finder sight being substantially larger in area than the target plane, accordingly affords a sighting area about which the cross hairs of the reticle can be moved by the gunner, as will be described below, until the cross hairs are on the target, at which time the gun is accurately aimed.

Movement of the reticle is effected by current input to the galvanometers, current for the galvanometer controlling the vertical cross hair, which determines horizontal deflection, being supplied from a generator geared to the turret for operation thereby. Current for the galvanometer controlling the horizontal cross hair, which determines vertical deflection, is supplied by another generator, geared to the gun or range finder in such a manner that vertical movement thereof operates its generator. Hence two control circuits are involved, one hereafter referred to as the horizontal deflection circuit, which is energized by rotation of the turret, and the other the vertical deflection circuit, which is energized by vertical pivotal movement of the gun.

From the above, it may be seen that the generator outputs are respectively proportional to the horizontal and vertical components of angular velocity of the line of sight relative to fixed axes in space as the gunner keeps his sight trained on a moving target. If, of course, the gun and target were stationary and the trajectory of the bullet were flat, there would be no necessity to move either the line of sight or the line of fire, and the two would coincide. Where, however, there is relative motion between gun and target as where one airplane is firing at another, a continued deviation of the line of sight is necessary to keep it on the target. As pointed out above, this movement of the line of sight is utilized to generate electrical energy.

Also as noted above the generator outputs are used to move the horizontal and vertical cross hairs which form the reticle. These voltages being proportional to the vertical and horizontal components of the angular velocity of the line of sight only, are not compensated for the factors of lead, trajectory, bullet jump and windage, and accordingly must be modified in accordance therewith if the correct deviation between the lines of sight and fire is to be attained so as to aim the gun accurately.

Accordingly we modify the voltage of the vertical deflection circuit as follows:

1. *For lead.*—An attenuator is connected across the generator and mechanically connected to the adjustment on the range finder. As the range finder is adjusted the resistance of the attenuator is varied so that the generator output voltage is varied by an amount proportional to the range of the instant of gun fire. A second attenuator is connected across the generator and is adjusted in accordance with the altitude. Hence, the total generator output is an approximate function of time of flight.

2. *For trajectory.*—Additional voltage is added to the circuit as by a battery, and this added voltage is metered into the circuit by at least two attenuators, one whose resistance is adjusted by the range finder adjustment, and the other whose resistance is varied by an amount proportional to the zenith position of the line of fire. The latter attenuator is connected mechanically or otherwise to the sight or the gun so that vertical movement thereof varies the resistance.

3. *The bullet jump.*—Additional voltage is added to the circuit and this added voltage is metered into the circuit by at least three attenuators. The resistance of the first is adjusted, by hand, if desired from a reading on a voltmeter calibrated in miles per hour so that the resistance is proportional to indicated air speed (IAS). The resistance of the second attenuator is adjusted by a cam or other mechanism operated by the gun, sight or turret during horizontal movement thereof so that the vertical component of bullet jump is proportional to the horizontal deviation of the line of fire from the longitudinal axis of the airplane. The resistance of the third attenuator is adjusted in accordance with altitude. When the line of fire is fore or aft of the airplane in a horizontal plane, the vertical component of bullet jump is zero.

4. *For windage.*—Additional voltage is added to the circuit, and this added voltage is metered into the circuit by five attenuators, so that the value of the voltage added is a product of several voltages of the several attenuators. The resistances of these attenuators are adjusted in accordance with IAS, azimuth position, zenith position, range and altitude, so that the vertical component of windage may be said to be proportional to these several factors.

The value of the vertical deflection voltage is impressed on the galvanometer which controls the horizontal cross hair so that the horizontal cross hair is moved to a position which effects deviation of the line of fire of the gun from the line of sight in such a manner that the vertical component of angular velocity of the line of fire is proportional to the vertical component of linear velocity of the target. Hence, the line of fire of the gun is caused to correctly lead the target in so far as the vertical component of lead is concerned.

The voltage of the horizontal deflection circuit is modified as follows:

1. *For lead, or relative motion.*—An attenuator, whose resistance is varied by the range finder adjustment, is connected across the generator so that the output thereof is proportional to the range. Furthermore, the horizontal component of lead or relative motion is effected by the vertical position of the gun. Hence, an attenuator, the resistance of which is varied according to the gun's zenith position is also connected across the generator further to modify its output. As altitude is a factor here, a third attenuator adjusted in accordance with altitude is connected across the generator.

2. *For bullet jump.*—Additional voltage is added to the circuit, and the value of this voltage is determined by the product of the outputs of at least four attenuators, the resistances of which are respectively adjusted in accordance with indicated air speed, azimuth position, zenith position and altitude. Hence, the component of horizontal deflection of the line of sight to compensate for bullet jump is proportional to IAS, azimuth and zenith positions and altitude, as stated.

3. *For windage.*—Additional current is added to the circuit and the voltage of this current is a product of the voltages of at least four attenuators whose resistances are varied respectively according to indicated air speed, horizontal position, range and altitude.

The horizontal deflection voltage is impressed on the second galvanometer which controls the position of the vertical cross hair, so that when the line of sight is varied to set the vertical cross hair on the target, the correct deviation is imparted to the line of fire so as to impart thereto the proper component of horizontal deflection, and hence to compensate the line of fire for the several factors which affect it. Hence, the horizontal component of angular velocity of the line of sight imparts to the line of fire a horizontal component of angular velocity which is in turn proportional to the horizontal component of linear velocity of the target. The resultant of the horizontal and vertical components of angular velocity of the line of fire, as determined by the similar components of angular velocity of the line of sight, is proportional to the resultant of the horizontal and vertical components of linear velocity of the target so that the line of fire leads the target by a correct amount.

In other words, when the gunner sights his target, he moves his range finder, and accordingly his gun, until the reticle formed by the cross hairs is on the target. This movement, as described above, energizes the two circuits, causing movement of the reticle so as to cause deviation between the line of sight and line of fire, which deviation accurately aims the line of fire so as to impart thereto a lead which is corrected for the several factors which must be compensated for if bullet and target are to meet.

It should be noted, however, that in a system as above described, the angular velocity of the lines of fire and sight is not necessarily constant, but might well be accelerating, in which case the angle of deflection between the gun and the line of sight will be increasing. Under such circumstances, the line of sight moves backward with respect to the line of fire by an amount which is proportional to the angular acceleration of the line of fire or the gun, i. e. the rate of change of angular velocity of the line of fire. Therefore, the angular velocity of the line of sight is the algebraic sum of the instantaneous angular velocity of the line of fire, plus the backward instantaneous angular velocity of the line of sight with respect to the line of fire. The correct deflection between the line of sight and the line of fire should be proportional to the angular velocity of the line of sight, but the actual deflection is proportional to the angular velocity of the gun. Therefore, an error is introduced in this deflection which is proportional to the angular velocity of the line of sight relative to the gun, and which is also proportional to the rate of change of angular velocity of the gun. To compensate or correct for this error, voltages are introduced into the horizontal and vertical deflection circuits in the opposite direction to that of the current flowing therein as a result of gun movement, and this counter E. M. F. is proportional to the rate of change of angular velocity of the gun. This counter E. M. F. may be introduced in each circuit as by a suitable self inductance, such as a choke coil, the number of effective turns of which are preferably varied in accordance with variations in range and altitude, so that the counter E. M. F. is proportional to time of flight.

Referring now to Figure 1, wherein there is schematically shown a movably mounted gun, vertical and horizontal deflection control circuits which are energized in accordance with gun movement, and a reticle, the movement of which is responsive to the control circuit's energization, the gun is generally indicated at 20 and is mounted on a suitable horizontal support 21 capable of rotation in a horizontal plane. The gun is also pivoted to a vertical support 22 extending upwardly from support 21 for movement in vertical planes. A gear sector 23 is secured to gun 20 for operation of a train of gears generally indicated at 24, connected to a generator 25. Support 21 may have teeth cut therein for operation of a train of gears generally indicated at 26, connected to a generator 27. Generator 25 energizes the vertical deflection circuit, whereas generator 27 energizes the horizontal deflection circuit.

*Vertical deflection circuit*

1. *Relative motion.*—A pair of lines 28 and 29 are connected to the opposite sides of generator 25, and lead to opposite sides of an attenuator 30, being connected to terminals 31 and 32 of the attenuator resistance 33. Attenuator 30 includes a slider arm 34 adapted to slide along resistance 33 to vary the generator output, and as arm 34 is connected to the range finder adjustment referred to hereinabove and described below, the value of resistance 33 is proportional to the range.

A line 210 connects slider 34 with resistance 211 of another attenuator generally indicated at 212, resistance 33 of attenuator 30 being connected by a line 213 to the other side of resistance 211 of attenuator 212.

Attenuator 212 includes a slider 214 adapted to slide along resistance 211, and this slider is manually adjustable in accordance with a reading taken from the airplane's altimeter. A line 35 is connected to slider 214, while a line 36 is connected to resistance 211 of attenuator 212, and as will now appear, the voltage across lines 35 and 36 is the generator output modified in accordance with the range and altitude, and hence is proportional to the lead necessary to correct for relative motion between gun and target. Line 35 is connected to a self inductance or the like, such as a choke coil 37, this coil being connected by a line 38 to one side of a galvanometer generally indicated at 39. The armature of the galvanometer has mounted thereon a post 40 from which extend arms 41 and 42, to the free ends of which is connected a horizontal cross hair 43. Upon energization of the galvanometer, cross hair 43 moves in a vertical plane to indicate vertical deflection in proportion to the voltage of the vertical deflection circuit.

2. *Trajectory.*—Line 36 is connected to a line 44, in turn connected to the slider 45 of an attenuator generally indicated at 46. Attenuator 46 has a resistance 47 over which slider 45 is positionable in accordance with variations in the zenith position of gun 20, movement of which causes movement of slider 45, as will be more particularly described hereinbelow. Terminal 48 of resistance 47 is connected by a line 49 to a slider 50 of an attenuator generally indicated at 51, and having a resistance 52. This attenuator is similar to attenuator 30, and its slider arm 50 is connected to slider arm 34 of attenuator 30, so that manual adjustment of the range finder is reflected in movement of arm 50 along resistance 52.

Attenuators 51 and 46 are supplied with current by a battery 53. Hence, it will appear that the output of attenuator 51 is connected to attenuator 46, and the product of the outputs of both is added to the voltage across lines 35 and 36. The total voltage thus flows through a line 54 connected to attenuators 46 and 51 and battery 53, and hence the added voltage across lines 44 and 54 is proportional to the range and to the drop of the bullet from its projected line of fire, excluding windage effects.

3. *Bullet jump.*—Line 54 is connected to a line 55, in turn connected to a slider 215 adapted to ride over the resistance 216 of an attenuator generally indicated at 217. Slider 215 is adjustable in accordance with a reading from the airplane's altimeter, and is preferably mechanically linked, as indicated by the dotted line 135, to altitude attenuator 212. Resistance 216 of attenuator 217 is connected by a line 218 to the slider 56 of an attenuator generally indicated at 57. Attenuator 57 includes a circular resistance 58 having a terminal 59 connected by a line 60 to a slider 61 adapted to slidably engage a resistance 62 of an attenuator generally indicated at 63. One side of resistance 62 is connected by a line 64 to one side of battery 53, the other side of the battery being connected to a line 65 connected to the side of resistance 62, and also to a terminal 66 on resistance 58 of attenuator 57. A voltmeter 67 is connected to lines 60 and 65 across battery 53, and is calibrated in miles per hour, so that slider 61 of attenuator 63 may be accurately adjusted to render the output of attenuator 63 proportional to indicated air speed. Slider 56 of attenuator 57 is mechanically or otherwise connected, as will be described in detail below to gun 20, or it is mounted in such a fashion that horizontal movement of the gun effects movement of slider 56, so that the resistance 58 of attenuator 57 is modified in accordance with the component of horizontal gun deflection. As the gun is usually positioned to fire from either the port or starboard beam of the airplaine, attenuator 57 is of a character as to reverse the current flow therefrom in accordance with the direction of fire of the gun. Thus, attenuator slider 56 is also connected to a line 219, in turn connected to the other side of resistance 216 of attenuator 217. This latter side of resistance 216 is connected to a line 68, so that the additional voltage across lines 55 and 68 is proportional to the vertical component of bullet jump, the value of which is determined by indicated air speed, azimuth position of the gun, and altitude. In this connection it should be noted that when the gun is firing directly fore or aft in a horizontal plane, there is no vertical component of bullet jump or, for that matter, any horizontal component. Hence, when the gun is firing fore or aft, attenuator slider 56 would be horizontal, as viewed in Figure 1, so that the product of the outputs of attenuators 57 and 63 is zero.

4. *Windage.*—Line 68 is connected to a line 69, in turn connected to a slider 70 of an attenuator generally indicated at 71, having a resistance 72 connected by a line 73, in turn connected to a slider 74 of another attenuator generally indicated at 75. Resistance 76 of attenuator 75 is connected by a line 77 to a slider 78 adapted to slide about a resistance 79 of an attenuator generally indicated at 80. Resistance 79 and the last-referred to attenuator is connected by a line 81 to the slider 82 of another attenuator generally indicated at 83, and having a resistance 84. Resistance 84 of attenuator 83 is connected by a line 85 to a slider 86 of an attenuator 87, whose resistance 88 is connected by a line 89 to one side of battery 53. The other side of battery 53 is connected by a line 90 to the other side of resistance 88, and also to resistance 84 of attenuator 83. A line 91 connected to slider 82 of attenuator 83 is also connected to resistance 79 of attenuator 80, and the slider 78 of this latter resistance is connected by a line 92 to resistances 76 and 72 of attenuators 75 and 71, respectively. The resistance of attenuator 71 is manaully adjustable in accordance with a reading from the altimeter (not shown) on the airplane, and hence its resistance is proportional to altitude. The resistance of attenuator 75 is adjusted upon adjusting the range finder, and hence its resistance is proportional to range. Attenuator 75 is mechanically connected to attenuators 30 and 51, 127 and 100, the five attenuators operating together as indicated by the dotted line 93.

Attenuator 80 is connected mechanically or otherwise to gun 20 so that its resistance is varied as the zenith position of the gun is varied. Attenuator 83 is, as noted above with respect to attenuator 57, adjusted upon horizontal movement of the gun, while attenuator 87 is set in accordance with indicated air speed as read from voltmeter 67 connected across battery 53. Hence it will appear that the added voltage across lines 69 and 92 is modified in accordance with indicated air speed, azimuth position, zenith position, range and altitude, all of which determine the value of the factor of windage.

Line 92 is connected to the other side of galvanometer 39, and it accordingly will appear that the voltage across lines 38 and 92 is proportional to the vertical components of relative motion, trajectory, bullet jump and windage.

Before going into the description of the horizontal deflection circuit, it should be noted in connection with attenuators 80 and 83 that the output of attenuator 80 is reversed as the gun swings past the horizontal, whereas the output of attenuator 83 is reversed as the gun swings fore or aft of its dead abeam position. It should further be noted that the output of attenuator 80 is zero when the gun is firing in a horizontal plane, as there is no component of vertical deflection in so far as windage is concerned, when the gun is laid horizontally. Also, when the gun is firing dead abeam on either side of the airplane, the output of attenuator 83 is zero as there is no component of vertical deflection when the gun is firing dead abeam. Preferably, the vertical deflection circuit is provided with a manually operable switch 94 which can be opened by the gunner when the gun is not in use, to preserve battery 53.

Preferably we provide another manually operated switch, such as switch 95 in line 92, which may be opened when desired to deenergize the entire vertical deflection circuit so that the gun may be aimed and fired without reference to the automatic gun sight.

*Horizontal deflection circuit*

1. *Relative motion.*—Generator 27, which generates current upon horizontal movement of gun 20, is connected by lines 96 and 97 to the ends of a resistance 98 of an attenuator generally indicated at 99. This attenuator includes a slider 100 which, through the mechanical linkage indicated by dotted line 93, is adjustable along resistance 98 in accordance with adjustment of the range finder, so that the output of attenuator 99 is proportional to range. Slider 100 is connected by a line 101 to the resistance 102 of another attenuator generally indicated at 103, resistance 102 also being connected to line 97. Attenuator 103 includes a slider 104 which, through the mechanical linkage indicated by dotted line 105, is connected to the sliders of attenuators 46 and 80. Accordingly, the resistance of attenuator 103 is varied in accordance with movement of gun 20 in vertical planes. Attenuator slider 104 is connected to a line 220, in turn connected to a resistance 221 of an attenuator generally indicated at 222, the slider 223 of which is connected to a line 106. The other side of resistance 221 of this attenuator is connected by a line 224 to line 97, line 224 also being connected to a line 225, and hence the voltage across lines 225 and 106 is the output of generator 27 as modified in accordance with range, zenith position and altitude, which together determine the value of the horizontal component of lead due to relative motion.

2. *Bullet jump*.—To compensate for the horizontal component of bullet jump, current is added to the horizontal deflection circuit from battery 53 by way of lines 107 and 108, the former being connected to line 106. Battery 53 is connected by lines 109 and 110 to the resistance 111 of an attenuator generally indicated at 112, having an adjustable slider 113 adapted to be hand set in accordance with indicated air speed, as described above in connection with attenuator 63. Slider 113 is connected by a line 114 to one terminal of a resistance 115 of an attenuator generally indicated at 116, resistance 115 also being connected to line 110. Resistance 115 is varied by a slider 117 which is linked mechanically or otherwise to the sliders of attenuators 57 and 83, so that the resistance of attenuator 116 is determined by the azimuth position of the gun.

Slider 117 of attenuator 116 is connected by lines 118 and 119 to the resistance 120 of an attenuator generally indicated at 121, which has a slider 122 mechanically linked to the sliders of attenuators 46, 80 and 103, as indicated by dotted line 105, so that the resistance of attenuator 121 is determined by the zenith position of the gun. Slider 122 of attenuator 121 is connected by a line 226 to the resistance 227 of an attenuator generally indicated at 228, the slider also being connected to the other side of this resistance by a line 229. Attenuator 228 includes a slider 230 which is preferably mechanically linked, as indicated by line 135, to the other altitude attenuators, so that adjustment thereof as heretofore described adjusts altitude attenuator 228. Resistance 227 of the latter attenuator is also connected to line 107. The added voltage across lines 107 and 108 is accordingly modified in accordance with indicated air speed, azimuth position, zenith position and altitude, which together determine the value of the horizontal component of bullet jump.

It should be noted, in connection with this portion of the circuit, that the output of attenuator 116 is zero when the gun is firing dead abeam, as in this position there is no horizontal component of deflection in so far as bullet jump is concerned. Also, the output of attenuator 121 is zero when the gun is firing in a horizontal plane, regardless of direction, as again there can then be no horizontal component of deflection in connection with bullet jump. It should further be noted that the outputs of attenuators 116 and 121 are reversed respectively as the gun swings past the dead abeam position, or passes from above to below the longitudinal axis of the plane, or vice versa.

3. *Windage*.—The horizontal deflection circuit voltage is further modified by the addition thereto of current from battery 53 connected to the circuit by lines 123 and 124, the former being connected to line 108. This additional current is controlled as to value by attenuators whose resistances are adjusted in accordance with indicated air speed, azimuth position, range and altitude, these attenuators being indicated generally at 125, 126, 127 and 128, respectively. Their respective sliders are connected with the sliders of the attenuators of similar type, as described above. Thus, slider 125a of the IAS attenuator 125 is connected as by mechanical linkage, indicated by dotted line 129, to attenuators 63, 87 and 112, all of these attenuators accordingly being manually adjusted until the voltmeter 67 connected thereacross gives a reading equal to the indicated air speed of the airplane. Slider 130 of attenuator 126 is connected to the sliders of attenuators 57, 83 and 116 as by mechanical linkage indicated by the dotted line 131, all of these attenuators being adjustable upon movement of the gun horizontally. Slider 132 of attenuator 127 is connected to the other attenuators, adjusted upon adjustment of the range finder through the mechanical linkage indicated by dotted line 93. Similarly, slider 134 of attenuator 128 is connected by mechanical linkage indicated by the dotted line 135 to slider 70 of attenuator 71, so that all of the altitude attenuators are adjusted simultaneously from a reading taken from the airplane's altimeter. Hence it follows that the modification of the voltage added to the horizontal deflection circuit across lines 123 and 124 is in accordance with indicated air speed, azimuth position of the gun, range and altitude, which determine the horizontal component of windage.

In connection with attenuator 126, it should be noted that the output thereof is zero when the gun is firing directly fore or aft, as under such circumstances there is no horizontal deflection in so far as windage is concerned. Furthermore, the output of this attenuator reverses as the gun is swung from port to starboard, or vice versa. The horizontal deflection circuit, furthermore, can be completely deenergized through manual operation of a switch 136, which may be connected to line 124.

Line 225 is connected to a choke coil 137, in turn connected by a line 138 to one side of a galvanometer generally indicated at 139. Line 124 is connected to the other side of galvanometer 139. The galvanometer armature is connected to a post 140, from which extend arms 141 and 142, to the free ends of which is connected a cross hair 143, which extends vertically and indicates horizontal deflection as the galvanometer energization varies.

It will now appear that cross hairs 43 and 143, the positions of which are controlled respectively by galvanometers 39 and 139, comprise the reticle hereinbefore referred to, which is visible in a focal plane of the range finder, all as will be described in detail hereinbelow.

From the above description of the vertical and horizontal deflection circuits, it may be seen that as the gunner trains his sight on the target, he must move both his range finder and gun, as the target moves, in order to keep the line of sight on the target. This movement, of course, operates generators 25 and 27, resulting in the energization of the two circuits which, of course, causes movement of the reticle formed by cross hairs 43 and 143. As pointed out above, the line of sight deviates from the line of fire, and this results because of the modifications to the deflection circuits which are made to compensate for the factors of relative motion, trajectory, bullet jump and windage. Hence, when the gunner has his line of sight on his target, his line of fire deviates therefrom by an amount sufficient to properly lead the target so that bullet and target meet.

It will also appear that as the sight and gun are moved, angular velocities are imparted to the line of sight and line of fire, which are constant so long as the angular velocity of the gun remains constant. When, however, the gun's angular velocity accelerates, the value of the voltages in the deflection circuits is increased, and this increase would cause the line of sight and line of fire to deviate, in effect causing the line of sight to move relative to the line of fire in a direction reverse to that of the line of fire. If this condition were not corrected, it would not be possible for the gunner to get his line of sight on his target. To counteract this action of the line of sight, a counter E. M. F. is introduced in each of the circuits, and this counter E. M. F. is proportional to the rate of change of angular velocity of the gun. Choke coils 37 and 137, in Figure 1, being of proper characteristics, introduce in each of the circuits the proper counter E. M. F. to counteract the relative backward movement of the line of sight from the line of fire, upon an acceleration in the angular velocity of the line of fire.

While the horizontal and vertical deflection circuits shown in Figure 1 are series circuits, the various groups of compensating attenuators may be connected in parallel. Furthermore, where there are in one circuit a substantial number of attenuators having variable resistances, it is preferable that each attenuator be of the so-called "T-pad" type, as will be described below, by the use of which the desired results are attained without varying the total circuit resistance. To this end, we have provided the vertical and horizontal deflection circuits shown in Figure 2, wherein the same number and grouping of attenuators are used as in Figure 1, but the groups are connected in parallel, and the individual attenuators are of the T-pad type.

Vertical deflection circuit

With reference to Figure 2, generator 25 (the vertical deflection generator) is connected by wires 144 and 145 to the input terminals 146 and 147 of an attenuator of the T-pad type, generally indicated at 148. Attenuator 148 includes a variable resistance 149, connected across generator 25, a pair of fixed series resistances 150 and 151, and a variable resistance 152, shunting fixed resistances 150 and 151. Attenuator or T-pad 148 may include one or more fixed balancing resistances, such as resistance 153. Variable resistances 149 and 152 are provided with contact sliders 154 and 155, so associated with their respective resistances that the output of attenuator 148 across its output terminals 156 and 157 may be varied without varying the total resistance of the circuit.

Attenuator output terminals 156 and 157 are respectively connected to lines 230 and 231, in turn connected to the input side of an attenuator generally indicated at 232. This attenuator is also of the T-pad type, and accordingly is capable of a variable output without causing a change in the total circuit resistance. Attenuator 232 is manually adjusted in accordance with a reading from the airplane altimeter, and its output side is connected to lines 158 and 159. Line 158 is connected to one terminal 160 of a self inductance generally indicated at 161, the other terminal 162 of which is connected by a line 163 to one side of galvanometer 39. Inductance 161 is provided for the same purpose as choke coil 37 (Figure 1), i. e. to introduce into the circuit a counter E. M. F. which is proportional to the rate of change or the acceleration of the angular velocity of the line of sight as hereinbefore described. Inductance 161 preferably includes a balancing fixed resistance 164, connected to a variable resistance 165, in turn connected to a coil 166, the coil being connected to inductance terminal 162. Also connected to inductance terminal 162 by a line 167 is a contact arm 168 adapted to selectively engage one of several coil taps 169. Resistance 165 is provided with a slider 170 which varies the resistance of resistance 165 with respect to that of coil 166, as contactor 168 engages one or another of coil taps 169, so as to maintain the total resistance of inductance 161 constant. Slider 170 and contactor 168 are mechanically linked so as to be capable of the stated operation. Also, slider 170 is mechanically linked as indicated by the dotted line 171 to sliders 155 and 154 of attenuator 148. Linkage 171 is connected with the manual adjustment on the range finder, as described below, so that when the gunner adjusts his range finder he automatically adjusts attenuator 148 so that the output thereof as across lines 158 and 159 is proportional to lead due to relative motion, the value of which is determined by range and altitude. Thus the line of fire is corrected for the factor of relative motion.

The vertical deflection circuit output is further modified by the addition thereto of current, which additional current is in turn modified in accordance with the factors of trajectory, bullet jump and windage, in much the same manner as that described above in connection with Figure 1. Thus, to provide vertical deflection to compensate for trajectory, we provide a pair of attenuators generally indicated at 172 and 173, the product of the outputs of which is carried by lines 174 and 175 to lines 176 and 177. The output of these attenuators is supplied from a battery 233 across which the attenuators are connected. These latter two lines connect respectively with lines 158 and 159, and accordingly feed into galvanometer 39. Attenuator 172 is connected by the mechanical linkage 171 with attenuator 148, and accordingly is operated therewith upon the gunner's manipulation of his range finder. Attenuator 173 is mechanically linked to gun 20, for example, as by mechanical linkage indicated by the dotted line 178, so that movement of the gun in vertical planes varies the resistance of attenuator 173.

To compensate for bullet jump, additional current is fed into lines 158 and 159 from a battery 234 through lines 179 and 180, which are respectively connected to lines 176 and 177. The value of the current across lines 179 and 180 is modified in accordance with indicated air speed, azimuth position and altitude, respectively by attenuators generally indicated at 181, 182 and 235. Attenuator 182 is connected to attenuator 235, in turn connected to lines 179 and 180, preferably by a reversing switch 183, so that the output of the attenuator may be automatically reversed in direction when the gun swings from port to starboard, or vice versa. The output from attenuator 182, being related to the azimuth position of the gun is, of course, zero when the gun is firing fore and aft, as in that position there is no vertical component of bullet jump.

Still further current is fed into lines 158 and 159 from battery 236 by way of a pair of lines 184 and 185 connected respectively to lines 176 and 177. The value of the current across lines 184 and 185 is a function of indicated air speed, azimuth position, zenith position, range and altitude, the compensations necessary for these factors being determined by the attenuators generally indicated at 186, 187, 188, 189 and 190. Attenuator 186 is similar to attenuator 181, being connected thereto as by a mechanical linkage indicated by the dotted line 191, this mechanical linkage being manually operable by the gunner in accordance with the indicated air speed of the airplane. The azimuth position attenuator 187 is mechanically connected to attenuator 182 as by a mechanical linkage indicated by the dotted line 192, so that the two attenuators are adjusted together upon horizontal movement of the gun. The output of attenuator 187 is shifted in direction when the gun swings past dead abeam position, by a reversing switch 193 which connects the azimuth position attenuator 187 to the zenith position attenuator 188. The latter attenuator is similar to attenuator 173, and is mechanically linked thereto by linkage 178 so as to be adjusted therewith upon vertical movement of gun 20. As gun 20 is capable of shooting both above and below the horizontal axis of the airplane, the output of zenith position attenuator 188 must be reversed when the gun swings from above the axis to a point below it, and to this end a reversing switch 194 is provided.

Reversing switch 194 connects attenuator 188 with attenuator 189, the resistance of which latter attenuator is adjusted with that of attenuator 148 upon manual adjustment of the range finder. These two attenuators are mechanically linked by linkage 171. The resistance of the altitude attenuator 190 is varied manually by the gunner in accordance with a reading taken from the airplane altimeter, the adjustment being effected by suitable mechanical linkage, as indicated by the dotted line 195.

From the above, it will appear that the various compensations for the vertical components of deflection of the factors of relative motion, trajectory, bullet jump and windage, are introduced into the vertical deflection circuit of Figure 2, by the several attenuators. It will further appear that as these attenuators are of the T-pad type, variation of their resistances does not result in a variation in the total circuit resistance. Furthermore, as the total circuit output is modified by the action of inductance 161, as described, the current impressed on galvanometer 39 results in a deflection of cross hair 43, which causes a vertical deflection of the line of fire sufficient to impart the necessary vertical component of lead to the gun with respect to the target.

*Horizontal deflection circuit*

As noted above with respect to the description of the horizontal deflection circuit of Figure 1, there are horizontal components of deflection in connection with the factors of relative motion between gun and target, bullet jump and windage, which must be imparted to the line of fire if it is to lead the target correctly, or, stated another way, the horizontal components of relative motion, bullet jump and windage must be allowed for, if the gun is to be correctly aimed. To this end, we have provided the horizontal deflection circuit shown in Figure 2, wherein the vertical cross hair 143, controlled by galvanometer 139, is deflected by an amount proportional to the horizontal component of angular velocity of the gun, modified by the horizontal components of relative motion, bullet jump and windage. As these modifications are effected in the circuit of Figure 2 in substantially the same manner as described above in connection with the horizontal deflection circuit in Figure 1, it will suffice to say that the relative motion compensation results from the adjustment of range, zenith position and altitude attenuators 196, 197 and 237; bullet jump compensation is effected through the adjustment of indicated air speed, azimuth position, zenith position and altitude attenuators 198, 199, 200 and 238, respectively, windage compensation being effected by indicated air speed, azimuth position, range and altitude attenuators 201, 202, 203 and 204, respectively. The group of relative motion attenuators 196, 197 and 237 modify the output of generator 27, the group of bullet jump attenuators 198, 199, 200 and 238 modify the additional current from battery 239, while the windage attenuators 201—204 modify a further addition of current from battery 240. All of these attenuators are, of course, preferably of the T-pad type, such as hereinbefore described, and accordingly the variations in their resistances have no effect on the total circuit resistance, which remains constant. The horizontal deflection circuit also includes an inductance 205, similar to inductance 161 to correct for rate of change of the horizontal component of angular velocity of the line of fire. It will now appear that the vertical and horizontal deflection circuits of Figure 2 react in substantially the same manner as those in Figure 1, to correctly deviate the line of fire from the line of sight so that the gun leads the target by a correct amount.

As pointed out hereinabove, inductances 161 and 205 are provided to vary the outputs of their respective circuits so that the deviation of the horizontal and vertical cross hairs will be corrected for the error introduced by the rate of change of the angular velocity of the line of fire. It should be noted in this connection, however, that in the place of these inductances (not shown) suitable transformers may be used to attain the desired end. Such a transformer would include a primary coil connected in the particular circuit involved, and a secondary coil (not shown) connected to a coil provided in the galvanometer which would when energized introduce a torque counter to that resulting from energization of the main circuit. Where such a transformer is used, it is desirable to connect into the circuit connecting the secondary coil with the counter torque galvanometer coil, a suitable attenuator similar to the T-pads shown in the circuits of Figure 2, so that the output of the transformer secondary could be modified in accordance with time of bullet flight as determined by range and altitude.

It will be noted that in the description of the circuits shown in Figure 2, we have assumed that the voltages of the several batteries would be fixed and constant in value. If the actual voltage varies, however from the desired value, suitable voltage controls must be introduced into the circuits to vary the voltages as desired. A voltmeter or other suitable indicating device may be provided to indicate that these controls are set at the proper value.

Referring now to Figures 3 and 4, wherein there is shown a gun and attached sight, which are used in conjunction with the control circuit shown in Figure 2, gun 20 includes a body portion 250, from which extends gun barrel 251, and which also has secured to the rear end thereof suitable gun manipulating handles 252 or the like. Gun body 250 is pivoted to support 22 to permit movement of the gun in vertical planes, all as will be described in detail hereinbelow. Support 22 is secured to and extends from a relatively heavy casting 253, which is preferably integrally formed with a base ring 254, on which walls 255 of a turret generally indicated at 256 are secured.

A ring 257, preferably L-shaped in cross section, is secured to the airplane fuselage structure (not shown) and has suitable surfaces to provide tracks for the support of anti-friction devices 258 connected to turret ring 254. This turret 256 is rotatable relative to ring 258 and to the airplane. Walls 255 (Figure 4) of turret 256 are indented as at 259 and 260 to provide suitable bearing mounts for bearings 261 and 262, respectively. These bearings rotatably support the opposite ends of a range finder, generally indicated at 263, provided with an eye piece 264 and conventional viewing windows 265 and 266. These viewing windows are conveniently positioned within the indentations in turret wall 255. A bracket 267 is suitably secured to the central portion of the barrel 268 of range finder 263, and extends therefrom in the direction of gun barrel 251 (see Figure 3). The forward end of bracket 267 is pivotally connected as by a link 269 to a portion or extension of the gun mount, as indicated at 500. As shown in Figure 4, range finder barrel 268 rests on bearings 261 and 262. Hence, pivotal movement of gun 251 results in pivotal movement of range finder 263 in such a manner that the longitudinal axes of the line of fire of the gun and the optical axis of the range finder are always parallel.

As shown in Figures 12-14, range finder barrel 268 of range finder 263 preferably comprises an outer tubular casing 270 (Figures 12 and 14) within which a rectangular tube 271 is mounted. In so far as the optical system in range finder 263 is concerned, conventional lens and prism systems may be used, but for varying the focus of the range finder we prefer to employ a lens system such as is generally indicated at 272 in Figure 14. Lens system 272 comprises a supporting frame 273 or the like, which is reciprocable longitudinally of rectangular tube 271 along guide tracks 274 and 275 mounted within the tube. A lens 276 is suitably mounted within frame 273 so that upon reciprocation of the frame, the position of the images at the focal plane of the range finder may be varied. A rack 277 is secured, as by a screw 278 to lens frame 273, and is sufficiently long to accommodate the full range of adjustment of lens 276. The teeth formed on the upper edge of rack 278 mesh with those of a gear 279 connected to a stud 280 or the like journaled in a bearing 281 connected to the side of rectangular tube 271. Stud 280 also has secured thereto another gear 282, the purpose of which will be described hereinbelow.

Attached to stud 280, in any suitable manner, is a flexible cable 283 which extends through a housing 284 secured to range finder barrel 268 to a point adjacent gun handles 252, where it is secured to gun body 250 by a bracket 285. The free end of cable 283 has secured thereto a control handle 501 readily accessible to the gunner's fingers when he is grasping gun handles 252, and by which the gunner can adjust the range finder, i. e. as the gunner rotates handle 501, its rotation is imparted by way of flexible cable 283 (Figure 14) to gear 279 (Figure 14) which reciprocates rack 277 and accordingly lens 276.

Preferably, to the right hand end of range finder 263, as viewed in Figure 4, is secured galvanometer 139 (Figure 12). Galvanometer 39 is similarly secured to the range finder barrel, but to the left-hand end thereof between lens system 272 and viewing window 265. As these galvanometers are identical in construction, galvanometer 139 only will be described. Thus, galvanometer 139 includes a casing 286 which houses conventional galvanometer structure 287, from which extends the galvanometer armature 288 (Figure 13), carrying a needle or arm 289. A post 140 with its arms 141 and 142 and vertical cross hair 143 is secured to galvanometer needle or arm 289 so that the galvanometer deflection is imparted to the cross hair 143 when the galvanometer is energized. Galvanometer 39 (Figure 4) similarly controls the deflection of the horizontal cross hair 43. Each of cross hairs 43 and 143 lies in a focal plane of the range finder so that to the eye they comprise the cross hairs of a reticle.

It will now appear with respect to Figure 4 that as the gunner adjusts range finder 263 through manipulation of handle or lever 501, the images of the target are brought into coincidence in the area of movement of the reticle formed by cross hairs 43 and 143.

As noted hereinabove, gun 20 is mounted for pivotal movement in vertical planes within turret 256 (Figure 3). A bracket 290 is secured to the front end of gun body 250, a similar bracket 291 being secured thereto a suitable distance rearwardly of the front end of the gun body. Each of these brackets has pins extending therefrom, such as studs 293 and 294 extending from opposite sides of bracket 290 as viewed in Figure 6. Studs 293 are secured to a side bracket generally indicated at 295, the upper end 296 of which is pivotably mounted on a pin 297 or the like which extends through the side bracket and is connected to a boss 298 formed on the upper end of one prong 299 of a yoke generally indicated at 300. Studs 294 of brackets 290 and 291 (see Figure 5) are secured to a side bracket generally indicated at 301, disposed on the other side of gun body 250 (Figure 6). An upward projection 302 (Figure 6) of side bracket 301 is pivotably mounted on a pin 303 which extends therethrough, and which is secured to a boss 304 formed on the upper end of the other prong of yoke 300. Hence it will appear that bracket 290, and accordingly gun 20 is pivotable about the axes of pins 297 and 303, which are coaxial. Yoke 300 is secured to the upper end of support 22, which is fixed in so far as movement in a vertical plane is concerned.

Side bracket 295 includes a lower portion 306 (Figure 5) having a circular edge generated from the axis of pin 297 (Figure 6) this edge having gear teeth cut thereon. Thus, lower portion 306 of side bracket 295 comprises a gear segment. Gear segment 306 (Figure 6) meshes with the teeth of a pinion 307 which is mounted on a shaft 308 housed in a gear casing 309 secured in any desired manner in fixed relation to gun 20. The ends of shaft 308 are preferably rotatably mounted in anti-friction bearings disposed in opposite walls of gear casing 309 so that vertical movement of gun 20 causes gear segment 306 to swing, and thus impart rotation by way of pinion 307 to shaft 308. The right-hand end of shaft 308 has mounted thereon a large gear 310 which meshes with a small pinion 311 mounted on shaft 312, rotatably journaled in the walls of gear casing 309. Also mounted on shaft 312 is another gear 313 which meshes with a pinion 314 secured to a shaft 315 also journaled in the walls of gear casing 309. Shaft 315 includes a slotted extension 316 which extends through a boss 317 projecting from the lower part of gear casing 309. Extending from boss 317 is a threaded reduction 318 on which generator 25 is mounted. If desired, additional suitable supporting brackets (not shown) for generator 25 may be provided. Shaft extension 316 is connected to the armature shaft 319 of generator 25 in conventional fashion.

It may now be seen that pivoting of gun 20 about the horizontal axes of pins 297 and 303 results in operation of generator 25 by reason of the driving connection between the gun and generator afforded by the gear train, consisting of gear segment 306, pinion 307, gear 310, pinion 311, gear 313 and pinion 314. By reason of the dimensioning of the several gears and pinions in this train, substantial R. P. M. is imparted to generator 25, by relatively small angular movement of the gun. The current output of generator 25 is utilized, as described above in connection with the description of the vertical deflection circuit shown in Figure 2.

As shown in Figure 5, side bracket 301 has secured thereto, so as to move therewith, a generally triangular shaped plate 320, this plate being secured to bracket 301 as by a post 321 (Figure 6). Plate 320 is held on the outer end of post 321 as by a nut and washer 322 so as to be spaced from bracket 301, the space between the bracket and plate being provided for a purpose described below. A second post 323 is secured to bracket 301 and extends therefrom through the other end of plate 320 (Figure 5) to provide a second support for the plate, the plate being held thereon as by a nut 324 threaded on the free end of the post. A stud 325 is fixed to plate 320, and as shown in Figure 6, extends laterally therefrom a substantial distance. If desired, the end of post 325 may be provided with a cam roller adapted to ride within a slot 326 of plate 327 mounted in the bifurcated end of a rod 328. Post 321 may, if desired, be provided with a cam roller, as at 329 (Figure 6) disposed between plate 320 and bracket 301. Cam roller 329 is adapted to ride within a slot 330 (Figure 5) formed in a plate 331 mounted in the bifurcated end of a rod 332.

Rods 328 and 332 are slidably supported in a bearing 333 which is secured to and extends from yoke 300. The lower end of rod 328 is slidably supported in a bearing 334, and the lower end of rod 332 is slidably supported in a bearing 335. It will now be seen, with reference to Figure 5, that as gun 20 is pivoted counterclockwise, for example, plate 320 and posts 321 and 325 also pivot. Post 325 accordingly rides along slot 326 in plate 327, and as it does so causes the plate and accordingly rod 328 to move axially. Axial movement is imparted in a similar fashion to rod 332.

Rod 328 has a number of gear teeth 328a cut therein, and these teeth mesh with a pinion 336 (Figure 6) mounted on the end of a shaft 337 (Figure 6) journaled in a bearing 338 formed on the end of a strut 339, secured to and extending downwardly from bearing 333. Shaft 337 is connected to the sliders of attenuators 200 and 188 (see also Figure 2) which, it will be recalled, are two of the zenith position attenuators in the horizontal and vertical deflection circuits.

The lower end of rod 332 (Figure 6) is provided with teeth 340 which mesh with a pinion 341 mounted on a shaft 342. Shaft 342 is connected to the slider arms of attenuators 173 and 197 (Figure 6) which, it will be noted, are the other two zenith position attenuators in the horizontal and vertical deflection circuits (see Figure 2). Thus, all of the zenith position attenuators are automatically adjusted in accordance with the attitude of gun 20 about its pivotal axis.

Figure 8:
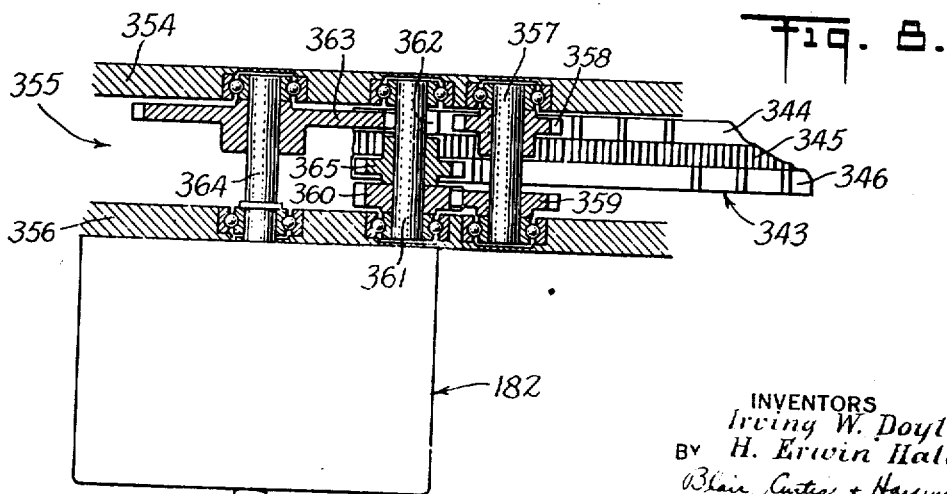
Figure 8 is an enlarged sectional elevation taken along the line 8—8 of Figure 7.

Referring now to Figure 3, base ring 251 has secured thereto an internal ring gear generally indicated at 343, having formed thereon three levels of teeth as at 344, 345 and 346 (Figure 8). As shown in Figure 9, generator 27, which is the horizontal deflection circuit generator, is mounted on turret ring 254 so as to move therewith upon rotation of the turret. The generator armature shaft 347 is keyed to a shaft 348 which is rotatably mounted in suitable anti-friction bearings in the walls of a gear casing 349. The free end of shaft 348 carries a pinion 350 which meshes with a large gear 351 secured to a shaft 352, which is also journaled in anti-friction bearings mounted in the walls of gear casing 349. Shaft 352 has mounted thereon or integrally formed therewith a pinion 353 which meshes with teeth 345 of ring gear 343. Inasmuch as the gear train just described, together with gear casing 349, are all secured with generator 27 to turret ring 254, all of these parts move with the turret upon rotation thereof. Hence, when the turret is rotated, the armature of generator 27 is driven at a substantial rate of speed by reason of the gear train described. Thus the generator's output is proportional to the angular velocity of the turret.

Mounted within turret 256 (Figure 4) is an instrument and control panel 354, one end of which forms the top wall of a gear casing generally indicated at 355 (Figure 8). A plate 356, secured in any suitable manner to panel 354 in spaced relation thereto, forms the bottom wall of gear casing 355. Journaled in suitable anti-friction bearings mounted in the walls of gear casing 355 is a shaft 357 having secured thereto a pinion 358. This pinion is adapted to mesh with teeth 344 of ring gear 343, which teeth, it will be noted, are substantially spaced from one another. The lower end of shaft 357 carries a gear 359, which meshes with a gear 360 mounted on the lower end of a shaft 361 journaled in bearings in the walls of gear casing 355. A pinion 362 is mounted on the upper end of shaft 361, and meshes with a large gear 363 mounted on a shaft 364 journaled in bearings in the gear casing walls.

Pinion 365 is also mounted on shaft 361 between gear 360 and pinion 362, the teeth of pinion 365 being adapted to mesh with teeth 346 on ring gear 343. Teeth 344 occur about ring gear 343 in angularly spaced groups, each group of teeth extending through 90°, teeth 346 being similarly grouped, but being positioned between adjacent groups of teeth 344.

Thus, rotation of turret 256 causes rotary movement of gear casing 355 (Figure 8) so that the gear train in casing 355 operates in one direction when teeth 344 mesh with pinion 358, the gear train operating in the opposite direction when teeth 346 engage pinion 365. Thus, for one direction of rotation of the turret, shaft 364 may rotate both counterclockwise and clockwise. Shaft 364 is connected to the sliders of the azimuth position attenuators 182, 187, 202 and 199 (Figures 2 and 11) whereby the resistances of these attenuators are adjusted in accordance with the azimuth position of the gun, the values of the adjusted resistances being determined to a certain extent by the design of the Geneva motions 358—344 and 365—346.

As noted hereinabove in connection with the description of Figure 2, the output of the azimuth position attenuators 182, 187, 202 and 189 must be reversed when the gun swings past its dead abeam position from port to starboard, or vice versa. This reversal is automatically accomplished by a pair of suitable reversing switches, such as that generally indicated at 366 in Figure 7, and displaced angularly 90°. Switch 366 is accordingly mounted on a projection 367 extending from the turret, and includes a notched disc 368, the notches of which are adapted to engage one of a pair of lugs 369 displaced 180° apart, and secured to base rings 257 (Figure 3). The two switches may thus be thrown to reverse the outputs of the azimuth position attenuators 187 and 199 when the gun swings past its dead abeam position and to reverse the outputs of attenuators 182 and 202 when the gun swings from port to starboard or vice versa, as described. Preferably a spring biased detent 370 is provided to hold switch disc 368 in any of its adjusted positions. It will now appear that rotation of turret 256 not only adjusts the resistances of the azimuth position attenuators, but also, through the operation of reversing switch 366, reverses their outputs automatically and at the proper time.

As shown in Figures 10 and 11, the instrument and control panel has secured thereto a battery box 371 in which batteries 233, 234, 236, 239 and 240 (Figure 2) are preferably disposed, suitable binding posts 372 (Figure 11) being provided for the batteries. Switch 94 is also mounted on panel 354 so as to break the battery circuits to conserve the batteries when not in use. We also preferably secure to panel 354, in any suitable manner, all of the altitude attenuators 232, 235, 190, 204, 238 and 237, their slider arms being mechanically linked as by a common shaft 373 operable by a knob 374. Knob 374 is also connected to a dial 375 (Figure 10) which is suitably calibrated to assist the gunner in adjusting the altitude attenuators to the correct value.

As hereinbefore noted, if the actual voltage of the batteries in box 371 varies, suitable voltage controls (not shown) are introduced into the circuits to vary the voltages as desired. Where such voltage controls are used, we provide a voltmeter 376, or other suitable indicating device, to indicate that such controls are properly set.

Inductances 161 and 205 (Figure 2) are disposed in casings 377 and 378 (Figure 11) secured to panel 354. The panel also carries the gang of indicated air speed attenuators 181, 186, 201 and 198, whose slider arms are controlled as by a common shaft 380 operable by a knob 381 connected to a dial 382 (see also Figure 10). Thus, the gunner can set the indicated air speed attenuators at their proper values through manipulation of knob 381, dial 382 being suitably calibrated. In a similar manner the gang of range attenuators 148, 172, 189, 203 and 196 may be secured to panel 354, with their sliders connected to a common shaft 383. As hereinbefore noted in connection with Figures 4 and 14, the range attenuators are automatically adjusted as the gunner adjusts range finder 263. Thus gear 282 (Figure 14) meshes with a similar gear (not shown) connected to a flexible cable 384 leading from housing 284 to a housing 385 (Figure 11) mounted on panel 354. Flexible cable 384 is connected to shaft 383 and thus adjustment of range finder 263 (Figures 4 and 14) is reflected in the adjustment of the range attenuators shown in Figure 11.

By way of summation, when the gunner aims gun 20 (Figure 3) and in so doing rotates turret 256 and pivots the gun, and at the same time adjusts range finder 263, automatic adjustment of the azimuth position, zenith position and range attenuators is effected, to effect the correct deviation between line of sight and line of fire so as accurately to lead the target, as above described. The altitude and indicated air speed attenuators are usually adjusted before the airplane takes off, as the bomber when on a mission usually flies at a predetermined speed and predetermined altitude. It is, of course, within the contemplation of our invention that the altitude and indicated air speed attenuators could be automatically adjusted by servo systems, or the like, operated from instruments on the airplane which respond to air speed and altitude. For practical purposes, however, manual adjustment of the altitude and indicated air speed attenuators is satisfactory.

In the above-described system, gun and sight are fixed. Under certain circumstances it is desirable to dispense with mechanical connection of gun and sight, as where the sight is located such a substantial distance from the gun as to make mechanical connection thereto impractical. Under such circumstances, we provide apparatus for automatically adjusting the gun, as by servo units, which may be controlled in identically the same manner as are galvanometers 39 and 139, by the control circuits of Figure 2. To this end we have provided the system shown in Figures 15 and 16.

In Figure 15, a turret generally indicated at 386 includes a base ring to which is secured a support 388, on which gun 20 is mounted for pivotal movement in vertical and horizontal planes. In this connection, yoke 300 is pivotally supported in the upper end of bracket 388 in such a manner that its pivotal axis is vertical to permit pivotal movement of the gun in a horizontal plane. The structure which permits pivotal movement of the gun in vertical planes about a horizontal axis is substantially the same as that shown in Figures 5 and 6.

A gear sector 389 is secured to gun body 250 with its center coaxial with the gun's horizontal pivotal axis. Gear 389 is connected by way of a gear train 390 to a servo unit 391 which is energized by the vertical deflection circuit shown in Figure 2. Servo unit 391 may be of conventional construction, and is essentially a power amplifier, its control elements requiring very small power inputs to control the power from some source (not shown) in such a manner that the output shaft of the servo unit assumes a position determined by the position given to its control element or elements. The servo unit 391 has at least two such control elements, and the output shaft position is determined by the algebraic sum of the positions of the control elements. One of the control elements is connected to the range finder 263 in a conventional manner (not shown) in such a way that the position of the control element corresponds to the zenith position of the range finder. The other control element is energized by the output of the vertical deflection circuit of Figure 2, and assumes a position in accordance with this output. Thus, the output shaft of the servo unit 391, acting through the gear train 390 and the gear sector 389, causes the gun to follow the zenith position of the range finder 263, and in addition causes the gun to deflect from the line of sight by an amount necessary to compensate for the vertical components of the factors of relative motion, trajectory, bullet jump and windage.

Yoke 300 also has secured thereto a gear sector 392 which pivots in a horizontal plane with the gun. Gear 392 meshes with a pinion 393 mounted on a shaft 394, the lower end of which carries a gear 395. Gear 395 meshes with a pinion 396 which is rotated upon energization of a servo unit 397. Servo unit 397 is controlled by the horizontal deflection circuit shown in Figure 2, and takes the place of galvanometer 139. Upon energization of servo unit 397, in accordance with the horizontal components of the factors of relative motion, bullet jump and windage, the correct horizontal deflection is imparted to gun 20 by way of the gear train just described.

Range finder 263 is suitably suspended, as by a bracket 398, from the top of turret 386, and is rotatable with turret 386 and also about its own horizontal axis in bearings 399 and 400, secured to bracket 398. Adjustment of the range finder is manually effected, as hereinbefore described, but in the present instance as by a knob 401. Knob 401 is mounted on a shaft 402 which also carries a cam 403. Cam 403 coacts with a follower 404 connected to a shaft 405, in turn connected to the sliders of the several range attenuators which, for convenience, are collectively indicated in Figure 16 at 406.

The other end of range finder 263 carries a gear 407, which meshes with a gear train generally indicated at 408, which operates vertical deflection generator 25. In this instance, the generator and its gear train are enclosed in a suitable casing 409, located within turret 386. Thus, rotation of range finder 263 about its horizontal axis operates generator 25 so that the generator output is proportional to the vertical component of angular velocity of the line of sight.

The zenith position attenuators 173, 188, 200 and 197 (Figure 2) are collectively indicated at 410 in Figure 16, and have their sliders controlled by a shaft 411, the end of this shaft carrying a cam follower 412 which coacts with a cam 413. Cam 413 is connected to a stud 414 or the like, and this stud is pivoted upon vertical positioning of gun 20 about its horizontal axis. Hence, as stud 414 turns, cam 413 coacts with follower 412 to adjust attenuators 410 and accordingly modify the circuits shown in Figure 2 in accordance with the vertical component of gun deflection, thus compensating the line of fire for the vertical components of the factors of trajectory, windage, bullet jump and relative motion.

The indicated air speed attenuators 181, 186, 201 and 198 (Figure 2) are collectively indicated at 415 in Figure 15, being mounted, if desired, on bracket 398 in a position convenient for manual operation by the gunner. The altitude attenuators 232, 235, 190, 204, 238 and 237 (shown in Figure 2) are collectively indicated at 416 in Figure 15, and may also be mounted on bracket 398 for convenient adjustment by the gunner.

Base ring 387 of turret 386 has secured thereto an exteriorly toothed ring gear 417 which is connected through a train of gears generally indicated at 418 with generator 27 when the turret is rotated to generate current for the horizontal deflection circuit, in the same manner as heretofore described in connection with the apparatus shown in Figures 3 and 4. The output of generator 27, together with additional current modified by attenuators, as will be described, is delivered to servo unit 391 to effect horizontal deflection of gun 20.

Base ring 387 of the turret also carries a cam 419 (Figures 15 and 16) which coacts with a follower 420 secured to the end of an arm 421 connected to a shaft 422 which operates the sliders of the azimuth position attenuators 182, 187, 202 and 199 (Figure 2), collectively indicated at 423 in Figure 16 (see also Figure 15). Thus, as turret 386 is rotated, the resistance of azimuth position attenuators 423 is automatically varied so as to modify the horizontal and vertical deflection circuits in the same manner as hereinbefore described, to compensate the line of fire in accordance with the horizontal and vertical components of bullet jump and windage.

If desired, ring gear 417 may be provided with an interior set of teeth 424 (Figure 15) which mesh with a pinion 425 driven by a booster motor 426 secured as by a bracket 427 to support 257. Booster motor 426 may be automatically energized when the gunner attempts to rotate turret 386, and upon such energization assists the gunner in rotating the turret.

It will now appear that with the system shown in Figures 15 and 16, gun 20 may be accurately aimed from a position remote from that of the gun. It should also be noted that where servo units such as units 391 and 397 are utilized to effect vertical and horizontal deflection in conjunction with the circuits shown in Figure 2, the inclusion of inductances 161 and 205 is unnecessary as the line of sight in range finder 263 (Figure 15) is stationary with respect to the optical axis of the range finder, i. e. the range finder in this instance is equipped with a fixed reticle.

It accordingly will appear that we have provided a method of and apparatus for aiming a gun, which attains the several objects hereinabove set forth in a thoroughly practical and efficient manner.

As many possible embodiments may be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

We claim:

1. A gun aiming device wherein the gun is aimed to lead its target by relatively offsetting the lines of fire and sight, the combination of, a movable sighting member, a movable gun member, means responsive to a plurality of variable factors determining the ballistic deflection of a projectile for producing an electrical value proportionate to said deflection under given instantaneous values of said factors, means responsive to angular movement of one of said members as said sight is trained on the target for producing a second electrical value proportionate to the relative angular velocity between the target and the platform of the gun member, means for modifying said second electrical value by an amount proportionate to the time of flight of the projectile whereby said electrical value as modified is proportionate to that portion of the total lead of the line of fire relative to the line of sight necessary to compensate for the relative motion between the target and the firing platform, means for algebraically adding said electrical values which are proportionate to ballistic deflection and relative motion to produce another electrical value proportionate to the required total offset of the lines of fire and sight relative to each other at the instant of gun discharge, and means controlled by said last-mentioned electrical value for angularly offsetting said gun member and the line of sight relative to one another by an amount proportional to said last-mentioned electrical value.

2. A gun aiming device wherein the gun is aimed to lead its target by relatively offsetting the lines of fire and sight, the combination of, a movable sight, a movable gun, means responsive to a plurality of variable factors determining the ballistic deflection of a projectile for producing an electrical value proportionate to said deflection under given instantaneous values of said factors, means responsive to angular movement of said gun as said sight is trained on the target for producing a second electrical value proportionate to the relative angular velocity between the target and gun platform, means for modifying said second electrical value by an amount proportionate to the time of flight of the projectile whereby said electrical value as modified is proportionate to that portion of the total lead of the line of fire relative to the line of sight necessary to compensate for the relative motion between the target and the firing platform, means for algebraically adding said electrical values which are proportionate to ballistic deflection and relative motion to produce another electrical value proportionate to the required total offset of the lines of fire and sight relative to each other at the instant of gun discharge, and means controlled by said last-mentioned electrical value for angularly offsetting said gun and the line of sight relative to one another by an amount proportional to said last-mentioned electrical value.

3. A gun aiming device wherein the gun is aimed to lead its target by relatively offsetting the lines of fire and sight, the combination of, a movable sight, a movable gun, means responsive to a plurality of variable factors determining the ballistic deflection of a projectile for producing an electrical value proportionate to said deflection under given instantaneous values of said factors, means responsive to angular movement of said sight as said sight is trained on the target for producing a second electrical value proportionate to the relative angular velocity between the target and gun platform, means for modifying said second electrical value by an amount proportionate to the time of flight of the projectile whereby said second electrical value as modified is proportionate to that portion of the total lead of the line of fire relative to the line of sight necessary to compensate for the relative motion between the target and the firing platform, means for algebraically adding said electrical values which are proportionate to ballistic deflection and relative motion to produce another electrical value proportionate to the required total offset of the lines of fire and sight relative to each other at the instant of gun discharge, and means controlled by said last-mentioned electrical value for angularly offsetting said gun and the line of sight relative to one another by an amount proportional to said last-mentioned electrical value.

4. A gun aiming device wherein the gun is aimed to lead its target by relatively offsetting the lines of fire and sight, the combination of, a movable sighting member, a movable gun member, means responsive to a plurality of variable factors for substantially instantaneously determining the ballistic deflection of a projectile for producing an electrical value proportionate to said deflection under given instantaneous values of said factors, means responsive to angular movement of one of said members as said sight is trained on the target for producing a second electrical value at the same instant the first is produced proportionate to the relative angular velocity between the target and gun platform, means for modifying at the same instant said second electrical value by an amount proportionate to the time of flight of the projectile whereby said second electrical value as modified is proportionate to that portion of the total lead of the line of fire relative to the line of sight necessary to compensate for the relative motion between the target and the firing platform, means for algebraically adding at the same instant said electrical values which are proportionate to ballistic deflection and relative motion to produce another electrical value proportionate to the required total offset of the lines of fire and sight relative to each other at the instant of gun discharge, and means controlled by said last-mentioned electrical value for angularly offsetting said gun member and the line of sight relative to one another by an amount proportional to said last-mentioned electrical value.

5. A gun aiming device wherein the gun is aimed to lead its target by relatively offsetting the lines of fire and sight, the combination of, a movable sighting member, a gun member, means responsive to a plurality of variable factors determining the ballistic deflection of a projectile for producing an electrical value proportionate to said deflection under given instantaneous values of said factors, means responsive to angular movement of one of said members as said sight is trained on the target for producing a second electrical value proportionate to the relative angular velocity between the target and the platform of said gun member, means for modifying said second electrical value by an amount proportionate to the time of flight of the projectile whereby said second electrical value as modified is proportionate to that portion of the total lead of the line of fire relative to the line of sight necessary to compensate for the relative motion between the target and the firing platform, means for algebraically adding said electrical values which are proportionate to ballistic deflection and relative motion to produce another electrical value proportionate to the required total offset of the lines of fire and sight relative to each other at the instant of gun discharge, means for modifying said last-mentioned electrical value by an amount proportionate to the rate of change of the angle of deflection between the line of fire and the line of sight when the lines of fire and sight are relatively offset, and means controlled by said last-mentioned electrical value as modified for angularly offsetting said gun member and the line of sight relative to one another by an amount proportional to said last-mentioned electrical value as modified.

6. A gun aiming device wherein the gun is mounted in a revoluble turret and is aimed to lead its target by relatively offsetting the lines of fire and sight, the combination of, a sight, a gun, means mounting said sight and gun in said turret for movement relative to one another, means responsive to a plurality of variable factors determining the ballistic deflection of a projectile for producing an electrical value proportionate to said deflection under given instantaneous values of said factors, means responsive to angular movement of said sight and said turret as the sight is trained on the target for producing a second electrical value proportionate to the relative angular velocity between the target and the turret, means for producing a third electrical value proportionate to the time of flight of the projectile, means for multiplying said second and third electrical values to produce a fourth electrical value which is proportionate to that portion of the total lead of the line of fire relative to the line of sight necessary to compensate for the relative motion between the target and the firing platform, means for adding algebraically said first and fourth electrical values which are proportionate to ballistic deflection and relative motion to produce another electrical value proportionate to the required total offset of the lines of fire and sight relative to each other at the instant of gun discharge, and means controlled by said last-mentioned electrical value for angularly offsetting the gun and the line of sight relative to one another by an amount proportional to said last-mentioned electrical value.

7. A gun aiming device as claimed in claim 2 wherein means electrically connected to said algebraically adding means are provided for modifying the electrical value which is proportionate to the required total offset of the lines of fire and sight relative to each other at the instant of gun discharge by an amount proportionate to the rate of change of the angle of deflection between the line of fire and the line of sight when the lines of fire and sight are relatively offset.

8. A gun aiming device wherein the gun is mounted in a revoluble turret and is aimed to lead its target by relatively offsetting the lines of fire and sight, the combination of, a sight, a gun, means mounting said sight and gun in said turret for movement relative to one another, means responsive to the factors of azimuth and zenith position of the target relative to the turret, to the altitude of the turret and to the distance between the turret and target for producing an electrical value proportionate to the ballistic deflection determined by said factors under given instantaneous values of said factors, means responsive to angular movement of said sight as said sight is trained on the target for producing a second electrical value proportionate to the relative angular velocity between the target and gun platform, means responsive to instantaneous values determined by factors of distance between turret and target and altitude of the turret for modifying said second electrical value whereby said second electrical value as modified is proportionate to that portion of the total lead of the line of fire relative to the line of sight necessary to compensate for the relative motion between the target and the turret, means for algebraically adding said electrical values to produce a third electrical value proportionate to the required total offset of the lines of fire and sight relative to each other at the instant of gun discharge, and means controlled by the fourth electrical value for angularly offsetting said gun and the line of sight relative to one another by an amount proportional to said last-mentioned electrical value.

9. A gun aiming device wherein the gun is mounted in a revoluble turret and is aimed to lead its target by relatively offsetting the lines of fire and sight, the combination of, a sight, a gun, means mounting said sight and gun in said turret for movement relative to one another, means responsive to the factors of azimuth and zenith position of the target relative to the turret, to the altitude of the turret and to the distance between the turret and target for producing an electrical value proportionate to the ballistic deflection determined by said factors under given instantaneous values of said factors, means responsive to angular movement of said sight as it is trained on the target for producing a second electrical value proportionate to the relative angular velocity between the target and gun platform means for modifying said second electrical value by an amount proportionate to the time of flight of the projectile whereby said second electrical value as modified is proportionate to that portion of the total lead of the line of fire relative to the line of sight necessary to compensate for the relative motion between the target and the firing platform, means for algebraically adding said electrical values which are proportionate to ballistic deflection and relative motion to produce another electrical value proportionate to the required total offset of the lines of fire and sight relative to each other at the instant of gun discharge, and means controlled by said last-mentioned electrical value for angularly offsetting said gun and the line of sight relative to one another by an amount proportional to said last-mentioned electrical value.

10. A gun aiming device wherein the gun is aimed to lead its target by relatively offsetting the lines of fire and sight, the combination of a movable gun, a sight movable with said gun and angularly offsettable relative thereto, a network including a source of power and a plurality of attenuators responsive respectively to variations of a plurality of variable factors determining the ballistic deflection of a projectile for producing an electrical value proportionate to said deflection under given instantaneous values of said factors, generator means connected to said gun and responsive to angular movement thereof as said sight is trained on the target for producing a second electrical value proportionate to the relative angular velocity between the target and gun platform, another network electrically associated with said generator means and including a plurality of attenuators responsive to variations of a plurality of factors determining time of flight for modifying said second electrical value by an amount proportional to the time of flight of the projectile, whereby said second electrical value as modified is proportional to that portion of the total lead of the line of flight relative to the line of sight necessary to compensate for the relative angular motion between the target and the gun platform, means connecting said networks to produce a third electrical value proportionate to the required total offset of the lines of fire and sight relative to each other at the instant of gun discharge, and means controlled by said third electrical value for relatively angularly offsetting the gun and said movable sight by an amount proportional to said third electrical value.

11. Apparatus according to claim 10 wherein at least some of the attenuators in the first network are operatively connected to the gun so as to respond to variations in the azimuth and zenith positions of the gun.

12. Apparatus according to claim 10 wherein at least some of the attenuators in the first network are operatively connected to the gun so as to respond to variations in the azimuth and zenith positions of the gun, other attenuators in said network being adjustable in accordance with variations in indicated air speed, range and altitude.

13. Apparatus according to claim 10 wherein at least some of the attenuators in the first network are operatively connected to the gun so as to respond to variations in the azimuth and zenith positions of the gun, and means actuated by movement of the gun for reversing the outputs of the azimuth and zenith attenuators when the azimuth position of the gun passes through points angularly displaced 180° and when the zenith position of the gun passes throught points angularly spaced 180° respectively.

14. Apparatus according to claim 10 wherein at least some of the attenuators in the first network are operatively connected to the gun so as to respond to variations in the azimuth and zenith positions of the gun, other attenuators in said network being adjustable in accordance with variations in indicated air speed, range and altitude, and means actuated by movement of the gun for reversing the outputs of the azimuth and zenith attenuators when the azimuth position of the gun passes through points angularly displaced 180° and when the zenith position of the gun passes through points angularly spaced 180° respectively.

15. Apparatus according to claim 10 wherein means electrically connected to said algebraically adding means are provided for modifying said third electrical value by an amount proportionate to the rate of change of the angle of deflection between the line of fire and the line of sight when the lines of fire and sight are offset relatively to one another.

16. Apparatus according to claim 7 wherein means electrically connected to said algebraically adding means are provided for modifying said second electrical value as modified, by an amount proportionate to range and to the rate of change of the angle of deflection between the line of fire and the line of sight when the lines of fire and sight are changing their offset relatively to one another.

IRVING W. DOYLE.
H. ERWIN HALE.